US012625732B2

(12) United States Patent
Eleti et al.

(10) Patent No.: US 12,625,732 B2
(45) Date of Patent: May 12, 2026

(54) SYSTEMS AND METHODS FOR GENERATING AND EXECUTING FUNCTION CALLS USING MACHINE LEARNING

(71) Applicant: OpenAI Opco, LLC, San Francisco, CA (US)

(72) Inventors: Athyuttam Eleti, San Francisco, CA (US); Jeffrey Harris, San Francisco, CA (US); Logan Kilpatrick, III, San Francisco, CA (US); Andrey Mishchenko, San Francisco, CA (US)

(73) Assignee: OpenAI OpCo LLC, San Francisco, CA (US)

( * ) Notice: Subject to any disclaimer, the term of this patent is extended or adjusted under 35 U.S.C. 154(b) by 0 days.

(21) Appl. No.: 19/064,870

(22) Filed: Feb. 27, 2025

(65) Prior Publication Data

US 2025/0272149 A1     Aug. 28, 2025

Related U.S. Application Data

(60) Provisional application No. 63/558,460, filed on Feb. 27, 2024.

(51) Int. Cl.
*G06F 9/50* (2006.01)
*G06F 9/451* (2018.01)
(Continued)

(52) U.S. Cl.
CPC ........... *G06F 9/5027* (2013.01); *G06F 9/546* (2013.01); *G06F 40/40* (2020.01); *G06N 20/00* (2019.01); *G06F 2209/541* (2013.01)

(58) Field of Classification Search
None
See application file for complete search history.

(56) References Cited

U.S. PATENT DOCUMENTS 10,496,452 B2 * 12/2019 Gamon .................... G06F 9/541
10,958,869 B1 * 3/2021 Chi ......................... H04N 11/02
(Continued)

FOREIGN PATENT DOCUMENTS

WO     WO2024213252 A1 * 10/2024

OTHER PUBLICATIONS

Dehaerne et al.; "Code Generation Using Machine Learning: A Systematic Review"; Aug. 10, 2022; IEEE; Digital Object Identifier 10.1109/ACCESS.2022.3196347 (Dehaerne_2022.pdf; pp. 82434-82455) (Year: 2022).*

(Continued)

*Primary Examiner* — Hiren P Patel
(74) *Attorney, Agent, or Firm* — Finnegan, Henderson, Farabow, Garrett & Dunner, LLP

(57) ABSTRACT

The methods, systems, and computer networking apparatuses described herein enable language models to receive input (e.g., a query or a request) from a user or application, and without any additional training data or instructions, determine to generate a function call based on the received input from the user and generate the function call based on the determination. In some embodiments, a language model may further access an external tool or application to request an output as a response to the generated function call. The disclosed methods, systems, and networking apparatuses improve the technical field by incorporating language model capabilities within the function calling process, and allowing for function-related information to be provided to a language model via input received in any number of formats or types, including structured or unstructured input, language or non-language input, or any combination thereof.

24 Claims, 9 Drawing Sheets

(51) Int. Cl.
| | |
|---|---|
| *G06F 9/54* | (2006.01) |
| *G06F 40/40* | (2020.01) |
| *G06N 20/00* | (2019.01) |

(56) References Cited

U.S. PATENT DOCUMENTS

| | | | | |
|---|---|---|---|---|
| 11,256,485 | B2 * | 2/2022 | Shi | G06F 16/24 |
| 11,922,144 | B1 * | 3/2024 | Mishchenko | G06F 8/35 |
| 11,947,933 | B2 * | 4/2024 | Todirel | G06F 11/1471 |
| 12,106,193 | B2 * | 10/2024 | Alkan | G06N 5/046 |
| 12,210,842 | B2 * | 1/2025 | Xu | G06N 3/048 |
| 2013/0111005 | A1 * | 5/2013 | Chu | G06Q 50/20 |
| | | | | 709/224 |
| 2015/0071528 | A1 * | 3/2015 | Marchisio | G06F 16/29 |
| | | | | 382/159 |
| 2019/0056722 | A1 * | 2/2019 | Abbaszadeh | G06F 21/55 |
| 2020/0099707 | A1 * | 3/2020 | Abbaszadeh | G06N 20/00 |
| 2020/0348912 | A1 * | 11/2020 | Katzenberger | G06F 9/5022 |
| 2020/0380415 | A1 * | 12/2020 | Siracusa | G06N 3/08 |
| 2021/0019125 | A1 * | 1/2021 | Shi | G06N 5/04 |
| 2021/0049502 | A1 * | 2/2021 | Wang | G06N 7/01 |
| 2022/0215285 | A1 * | 7/2022 | Daly | G06N 20/00 |
| 2022/0238116 | A1 * | 7/2022 | Gao | G10L 17/02 |
| 2022/0358397 | A1 * | 11/2022 | Alkan | G06N 5/025 |
| 2022/0398449 | A1 * | 12/2022 | Khanna | G06N 5/01 |
| 2023/0014435 | A1 * | 1/2023 | Shanker | G06F 16/2282 |
| 2023/0342233 | A1 * | 10/2023 | López | G06F 11/3612 |
| 2023/0367602 | A1 * | 11/2023 | Eisner | G06F 9/3842 |
| 2024/0004623 | A1 * | 1/2024 | Groenewegen | G06F 8/42 |
| 2024/0020096 | A1 * | 1/2024 | Chen | G06F 40/30 |
| 2024/0022424 | A1 * | 1/2024 | Schreck | H04L 9/50 |
| 2025/0077396 | A1 * | 3/2025 | Sen | G06F 11/3698 |
| 2025/0077915 | A1 * | 3/2025 | Polleri | H04L 51/02 |

OTHER PUBLICATIONS

Shim et al.; "DeeperCoder: Code Generation Using Machine Learning"; IEEE 2020; (Shim_2020.pdf; pp. 0194-0199) (Year: 2020).*

Matthieu Zimmer et al. (WO 2024/213252 A1, Huawei Tech. Co. Ltd., PCT filed: Apr. 13, 2023); "Apparatus and method for the training of a code synthesis model"; (WO2024213252_Zimmer.pdf;) (Year: 2023).*

* cited by examiner

200

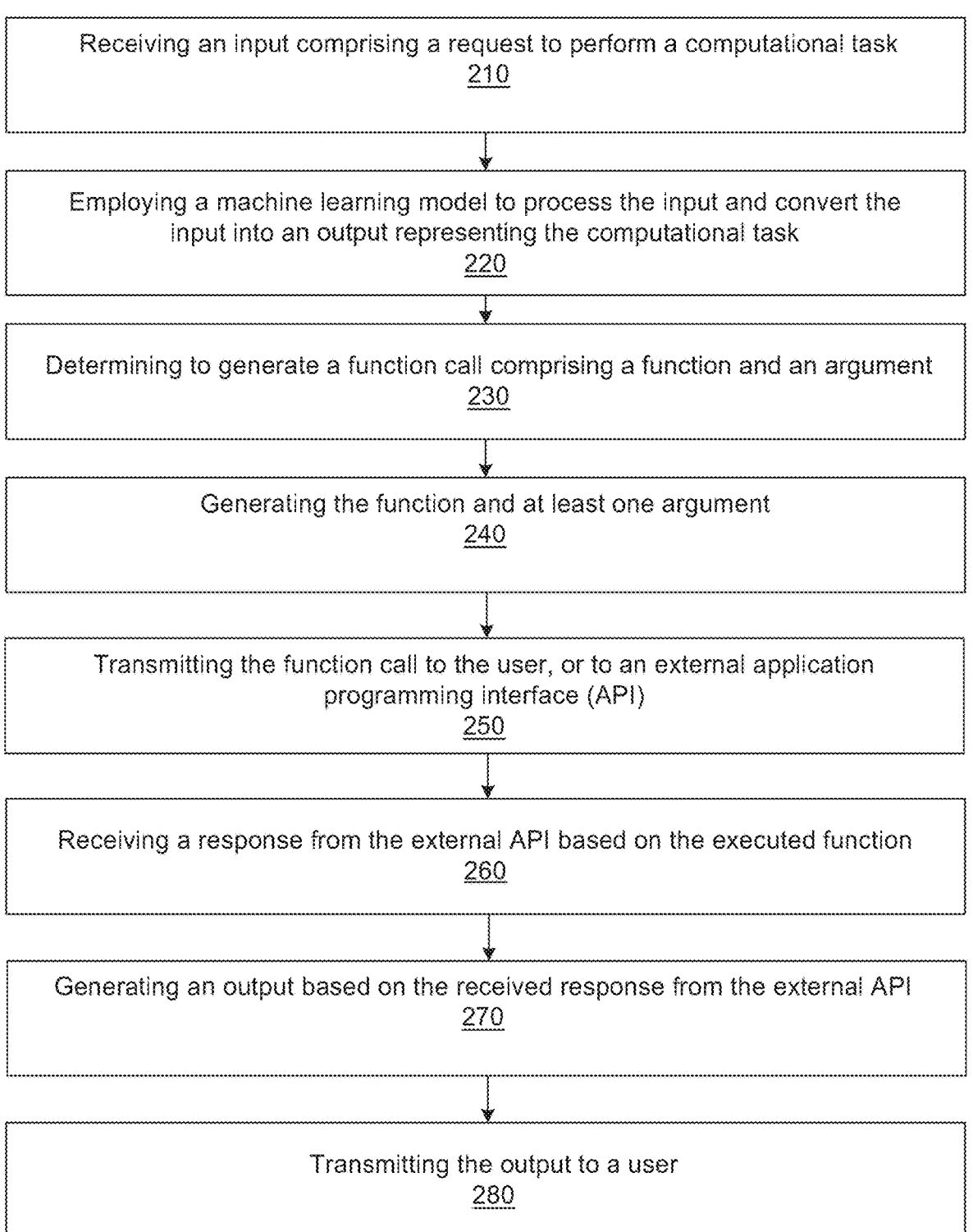

Receiving an input comprising a request to perform a computational task
210

Employing a machine learning model to process the input and convert the input into an output representing the computational task
220

Determining to generate a function call comprising a function and an argument
230

Generating the function and at least one argument
240

Transmitting the function call to the user, or to an external application programming interface (API)
250

Receiving a response from the external API based on the executed function
260

Generating an output based on the received response from the external API
270

Transmitting the output to a user
280

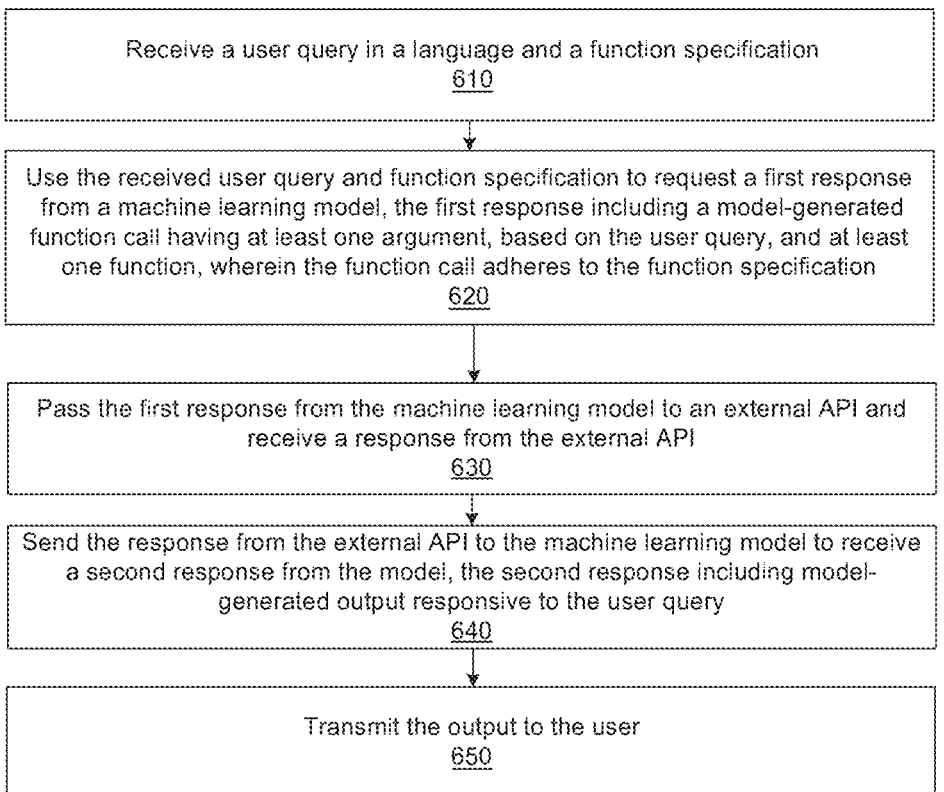

Receive a user query in a language and a function specification
610

Use the received user query and function specification to request a first response from a machine learning model, the first response including a model-generated function call having at least one argument, based on the user query, and at least one function, wherein the function call adheres to the function specification
620

Pass the first response from the machine learning model to an external API and receive a response from the external API
630

Send the response from the external API to the machine learning model to receive a second response from the model, the second response including model-generated output responsive to the user query
640

Transmit the output to the user
650

*FIG. 6*

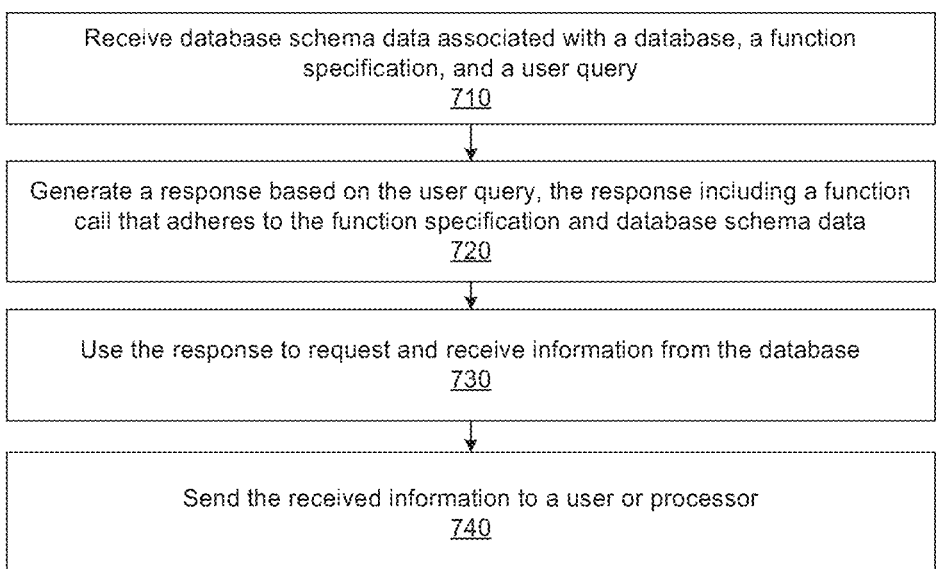

700

Receive database schema data associated with a database, a function
specification, and a user query
710

Generate a response based on the user query, the response including a function
call that adheres to the function specification and database schema data
720

Use the response to request and receive information from the database
730

Send the received information to a user or processor
740

FIG. 7

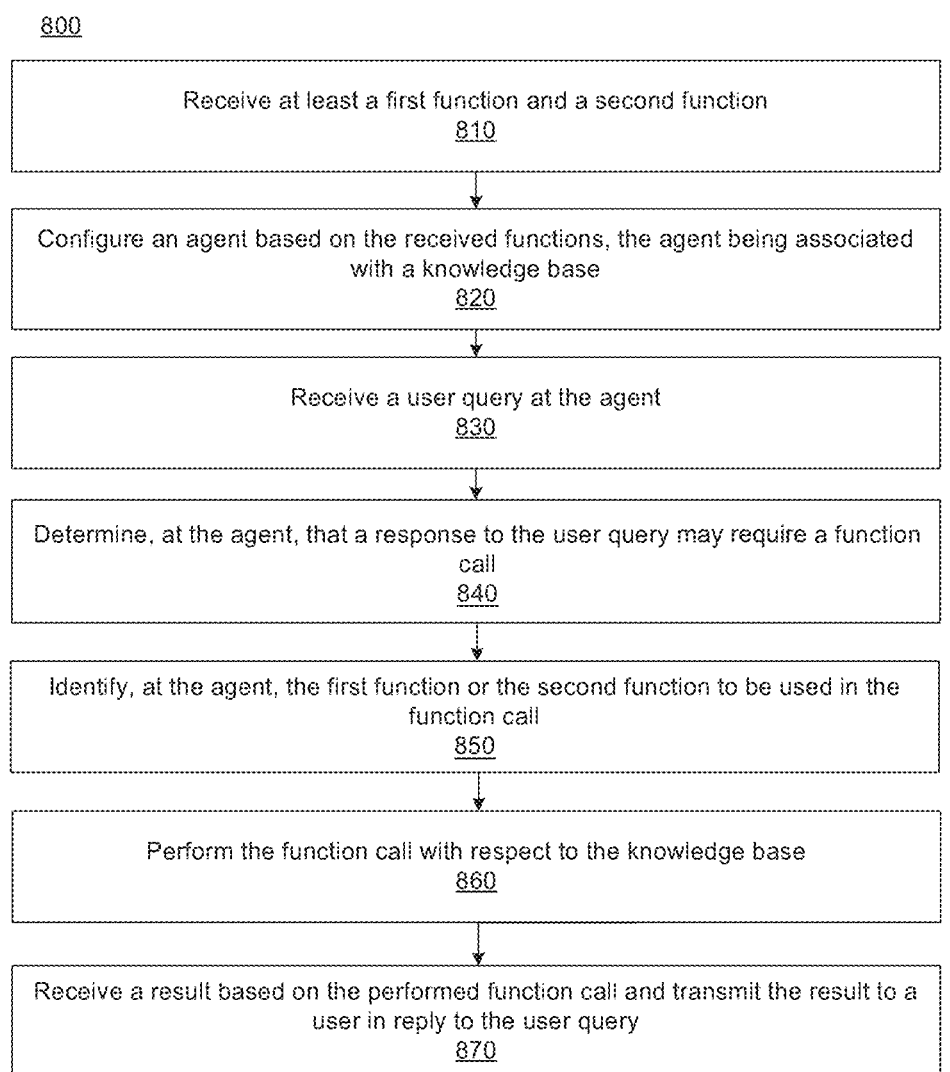

800

Receive at least a first function and a second function
810

Configure an agent based on the received functions, the agent being associated
with a knowledge base
820

Receive a user query at the agent
830

Determine, at the agent, that a response to the user query may require a function
call
840

Identify, at the agent, the first function or the second function to be used in the
function call
850

Perform the function call with respect to the knowledge base
860

*FIG. 8*          Receive a result based on the performed function call and transmit the result to a
user in reply to the user query
870

900

SYSTEMS AND METHODS FOR GENERATING AND EXECUTING FUNCTION CALLS USING MACHINE LEARNING

FIELD OF DISCLOSURE

The disclosure generally relates to systems, methods, and computer networking apparatuses for generating and executing function calls using machine learning.

BACKGROUND

Language Models (LMs) represent a transformative branch of machine learning (ML) and artificial intelligence (AI), leveraging advanced deep learning algorithms to process, understand, and generate human-like natural language. These sophisticated systems are trained on massive datasets, enabling them to recognize intricate patterns, relationships, and structures within textual data. The versatility of LMs extends across numerous applications, including language translation, sentiment analysis, automated dialogue systems, content generation, and more. At their core, LMs possess the remarkable ability to comprehend and generate complex textual information. They can identify entities and their relationships, perform contextual reasoning, and generate coherent, grammatically accurate text. This makes them invaluable for solving intricate tasks that demand not only linguistic fluency but also contextual understanding and logical inference.

Interaction with LMs typically involves users providing input in the form of prompts, such as questions, instructions, or scenarios. In response, the LM processes the input using its deep neural network-based algorithms and generates tailored outputs. This interaction often unfolds iteratively, with sequences of prompts refining the model's responses to address multifaceted problems or nuanced user requirements. Moreover, the adaptability of LMs allows for their fine-tuning and specialization in complex domains, such as, e.g., cybersecurity and threat intelligence, scientific research, data analysis, or creative writing. By harnessing their capacity for reasoning, context determination, and advanced computation, LMs are driving innovation across industries, reshaping how tasks are approached and how problems are solved.

SUMMARY

Language models, while useful for certain functions, may be limited in many ways. For example, training a language model is expensive, and coupled with the fact that training data is often out-of-date and/or must be tailored specifically to one of many potential applications, the cost of training continues to rise while the benefits of the training may remain limited. Furthermore, with regard to external data and applications, language models typically can only perform limited, if any, operations relating to the generation and execution of function calls associated with the external data and applications.

There also exists a need for increasing the capabilities and processing power of language models by adding technical solutions that adapt the models so they are able to determine when external information may be useful, and to utilize such external information, when helpful, to perform tasks and/or answer questions based on user queries. Drawbacks of existing solutions include a limited knowledge base based solely on training data received by the model, an inability to determine, based on a user input, if a function call is necessary, and also the inability to generate proper function calls as well as arguments for particular functions before making a function call to an external API.

The disclosed methods, systems, and computer networking apparatuses present technological improvements as solutions to one or more of the technical problems in conventional systems.

The methods, systems, and computer networking apparatuses described herein enable language models to receive input (e.g., a query or a request) from a user, and without any additional training data or instructions, access an external tool or application to request an output from that external tool or application as a response to the received input. In some embodiments, the language models may provide a response to a received input from a user without accessing an external tool or application to first obtain a particular output. Prior to requesting the output from an external tool or application, the language models may be configured to determine to use a function to receive the proper output and to generate the necessary function to be sent to the external tool or application. In some embodiments, the language models may be configured to determine to use a function and/or to provide a function call to the user based on the received input. Based on additional user input or based on documentation or information that is available online, language models may further be enabled to harvest data (e.g., provided by a user or available online) to understand the functions available for interacting with an API associated with the external tool or application. In some embodiments, language models may be enabled to receive a template function as input without performing any further modification (other than providing, e.g., a populated function call) based on the received template function.

Language models may thereby take safe, valid, and constrained actions with respect to a tool or application external to the model on behalf of a user interacting with the language model. In some embodiments, the model may communicate with the API and provide a resulting output from the external tool or application to the user, e.g., in a language, and without the user needing to access the external tool or application on their own. In some embodiments, the model may provide to the user a function call, including identified function parameters, for sending directly to the API of the external tool or application. Moreover, all of these steps may be performed without any involvement from users, developers, or administrators associated with the external application or with the language model or associated systems. This also allows the model (or user) to remain capable of accessing the tool or application without requiring reconfiguration when the external tool or application is updated.

Other systems, methods, and computer networking apparatuses are also discussed within this disclosure.

BRIEF DESCRIPTION OF THE DRAWINGS

The accompanying drawings, which are incorporated in and constitute a part of this specification, illustrate several of the disclosed methods, systems, or apparatuses and, together with the description, serve to explain the disclosed principles. In the drawings:

FIG. 2 illustrates an exemplary method for generating and executing function calls, according to some of the disclosed methods, systems, or apparatuses.

FIG. 6 illustrates another exemplary method for generating and executing function calls, according to some of the disclosed methods, systems, or apparatuses.

FIG. 7 illustrates yet another exemplary method for generating and executing function calls, according to some of the disclosed methods, systems, or apparatuses.

FIG. 8 illustrates yet another exemplary method for generating and executing function calls, according to some of the disclosed methods, systems, or apparatuses.

DETAILED DESCRIPTION

Figure 1:
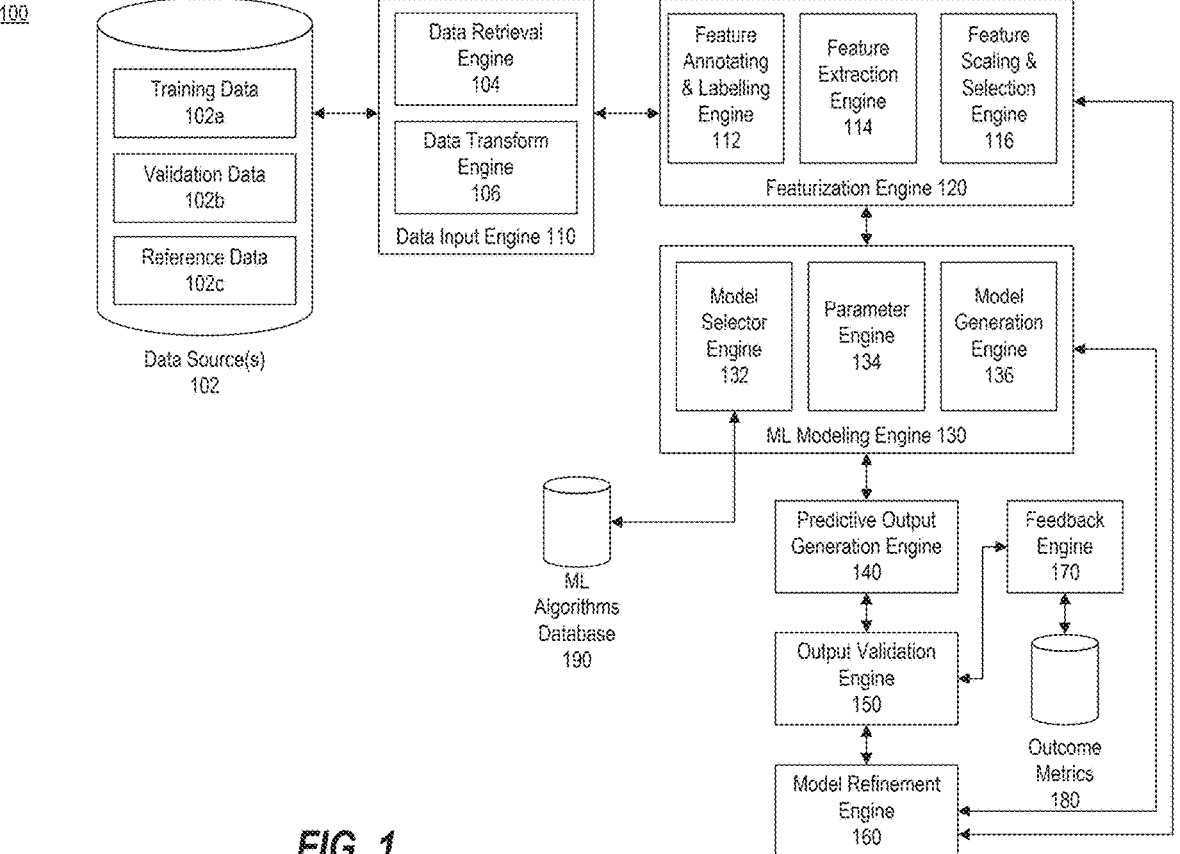
FIG. 1 is a block diagram illustrating an exemplary machine learning platform for implementing various aspects of this disclosure, according to some of the disclosed methods, systems, or apparatuses.

Language models, as used herein, may refer to machine learning models designed to understand, generate, or process input. Input or output, as used herein, may refer to, e.g., a natural language (e.g., text, spoken word), a programming language (e.g., software code), an encoded language (e.g., encoded messages), a markup language (e.g., HTML, XML), a modeling language (e.g., Unified Modeling Language), a mathematical language (e.g., expressions or formulas using symbols or syntax), other types of language input or output, and non-language input or output (e.g., images, video, audio, sensor data, graphs, networks, structures, gestures or body movements, touch input, biometric data).

Exemplary disclosed methods, systems, or apparatuses are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example of the disclosed methods, systems, or apparatuses. However, it will be understood by those skilled in the art that the principles of the example of the disclosed methods, systems, or apparatuses may be practiced without every specific detail. Well-known methods, procedures, and components have not been described in detail so as not to obscure the principles of the example of the disclosed methods, systems, or apparatuses. Unless explicitly stated, the example methods and processes described herein are neither constrained to a particular order or sequence nor constrained to a particular system configuration. Additionally, some of the described methods, systems, apparatuses, or elements thereof can occur or be performed (e.g., executed) simultaneously, at the same point in time, or concurrently. Reference will now be made in detail to the disclosed methods, systems, or apparatuses, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary disclosed methods, systems, or apparatuses and together with the description, serve to outline principles of the exemplary of the disclosed methods, systems, or apparatuses.

This disclosure may be described in the general context of customized hardware capable of executing customized preloaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed methods, systems, or apparatuses may also be practiced in distributed computing environments where tasks are performed by remote processing devices that are linked through a communications network. In a distributed computing environment, program modules may be located in local and/or remote computer storage media including memory storage devices.

The disclosed methods, systems, or apparatuses discussed herein involve or relate to artificial intelligence (AI). AI may involve perceiving, synthesizing, inferring, predicting and/or generating information using computerized tools and techniques (e.g., machine learning). For example, AI systems may use a combination of hardware and software as a foundation for rapidly performing complex operations to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training input data), which allows the model to improve its abilities. For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that will lead to an improved output.

Powerful combinations of model parameters and sufficiently large datasets, together with high-processing-capability hardware, can produce sophisticated models. These models enable AI systems to interpret incredible amounts of information according to the model being used, which would otherwise be impractical, if not impossible, for the human mind to accomplish. The results, including the results of the disclosed methods, systems, or apparatuses discussed herein, are astounding across a variety of applications. For example, an AI system can be configured to autonomously navigate vehicles, automatically recognize objects, instantly generate language, understand human speech, and generate artistic images.

Augmenting language models so that they can interact automatically, accurately, and safely with external tools is a complex technical problem. The present applications based solely on a user's input solves the problems described above and enable the production of sophisticated language models that may be associated and integrated with external systems. The solutions described herein enable language models to receive input from a user, and without any additional training data or instructions, access an external tool or application to generate an output in response to the received input, as provided by the external tool or application. Based on the user input or based on documentation that is available online, language models may harvest data (e.g., provided by a user or available online) to understand the functions available to them in interacting with an API associated with the external tool or application. In turn, the language model may take both safe, valid, and constrained actions with respect to a tool or application external to the model on behalf of a user interacting with the language model. The model may thereby provide a resulting output from the external tool or application to the user, all without the user needing to access the external tool or application on their own. Moreover, all of this may be performed without any involvement from users, developers, or administrators associated with the external application or with the language model or associated systems. This also allows the model to remain capable of accessing the tool or application without requiring reconfiguration.

Connecting language models to external tools and applications introduces new opportunities including increasing the efficiency and accuracy of language models and systems associated therewith, allowing users to interact with various external tools and applications via a single language model user interface, verifying sources and information that the language model draws upon, reducing inaccuracies resulting from multiple user interfaces and/or API access points, and improving interoperability between language models and other applications.

Disclosed systems and methods improve the technical field of integrating machine learning models with external applications by automating and thereby simplifying the process required to integrate and update external applications, tools, and information. Disclosed systems and methods further improve the technical field by incorporating language model capabilities within the function calling process, thereby allowing for function-related information to be provided to the language model via input received in any number of formats or types, including, e.g., structured or unstructured input, language or non-language input, or any combination thereof. Disclosed systems and methods also improve the functioning of computers by providing a platform that integrates generative machine learning output with external application function calling, which results in increased scalability, automation, efficiency, and relevancy of machine learning model output (e.g., based on an intended result).

Illustrative methods, systems, and computer networking apparatuses of the present disclosure are described below.

FIG. 1 is a block diagram illustrating an exemplary machine learning platform for implementing various aspects of this disclosure, according to some of the disclosed systems or methods.

System 100 may include data input engine 110 that can further include data retrieval engine 104 and data transform engine 106. Data retrieval engine 104 may be configured to access, interpret, request, or receive data, which may be adjusted, reformatted, or changed (e.g., to be interpretable by another engine, such as data input engine 110). For example, data retrieval engine 104 may request data from a remote source using an API. Data input engine 110 may be configured to access, interpret, request, format, re-format, or receive input data from data source(s) 102. For example, data input engine 110 may be configured to use data transform engine 106 to execute a re-configuration or other change to data, such as a data dimension reduction. Data source(s) 102 may exist, e.g., at one or more memories and/or data storages. In some of the disclosed methods, systems, or apparatuses, data source(s) 102 may be associated with a single entity (e.g., organization) or with multiple entities. Data source(s) 102 may include one or more of training data 102a (e.g., input data to feed into a machine learning model as part of one or more training processes), validation data 102b (e.g., data against which at least one processor may compare model output, such as to determine model output quality), and/or reference data 102c. In some of the disclosed methods, systems, or apparatuses, data input engine 110 can be implemented using at least one computing device (e.g., computing device 902 in FIG. 9). For example, data from data sources 102 can be obtained through one or more I/O devices and/or network interfaces. Further, the data may be stored (e.g., during execution of one or more operations) in a suitable storage or system memory. Data input engine 110 may also be configured to interact with data storage 908 in FIG. 9, which may be implemented on a computing device that stores data in storage or system memory. System 100 may include featurization engine 120. Featurization engine 120 may include feature annotating & labeling engine 112 (e.g., configured to annotate or label features from a model or data, which may be extracted by feature extraction engine 114), feature extraction engine 114 (e.g., configured to extract one or more features from a model or data), and/or feature scaling and selection engine 116. Feature scaling and selection engine 116 may be configured to determine, select, limit, constrain, concatenate, or define features (e.g., AI features) for use with AI models. System 100 may also include machine learning (ML) modeling engine 130, which may be configured to execute one or more operations on a machine learning model (e.g., model training, model re-configuration, model validation, model testing), such as those in the processes described herein. For example, ML modeling engine 130 may execute an operation to train a machine learning model, such as adding, removing, or modifying a model parameter. Training of a machine learning model may be supervised, semi-supervised, or unsupervised. In some of the disclosed methods, systems, or apparatuses, training of a machine learning model may include multiple epochs, or passes of data (e.g., training data 102a) through a machine learning model process (e.g., a training process). In some of the disclosed methods, systems, or apparatuses, different epochs may have different degrees of supervision (e.g., supervised, semi-supervised, or unsupervised). Data into to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed methods, systems, or apparatuses in any way, a machine learning model may include millions, billions, or even trillions of model parameters. ML modeling engine 130 may include model selector engine 132 (e.g., configured to select a model from among a plurality of models, such as based on input data), parameter selector engine 134 (e.g., configured to add, remove, and/or change one or more parameters of a model), and/or model generation engine 136 (e.g., configured to generate one or more machine learning models, such as according to model input data, model output data, comparison data, and/or validation data). Similar to data input engine 110, featurization engine 120 can be implemented on a computing device. In some of the disclosed methods, systems, or apparatuses, model selector engine 132 may be configured to receive input and/or send output to ML algorithms database 190 (e.g., a data storage 908). Similarly, featurization engine 120 can utilize storage or system memory for storing data and can utilize one or more I/O devices or network interfaces for sending or receiving data. ML algorithms database 190 (or other data storage 908) may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 100 may further include predictive output generation engine 140, output validation engine 150 (e.g., configured to apply validation data to machine learning model output), feedback engine 170 (e.g., configured to apply feedback from a user and/or machine to a model), and model refinement engine 160 (e.g., configured to update or re-configure a model). In some of the disclosed methods, systems, or apparatuses, feedback engine 170 may receive input and/or send output (e.g., output from a trained, partially trained, or untrained model) to outcome metrics database 180. Outcome metrics database 180 may be configured to store output from one or more models and may also be configured to associate output with one or more models. In some of the disclosed methods, systems, or apparatuses, outcome metrics database 180, or other device (e.g., model refinement engine 160 or feedback engine 170) may be configured to correlate output, detect trends in output data, and/or infer a change to input or model parameters to cause a particular model output or type of model output. In some of the disclosed methods, systems, or apparatuses, model refinement engine 160 may receive output from predictive output generation engine 140 or output validation engine 150. In some of the disclosed methods, systems, or apparatuses, model refinement engine 160 may send the received output to featurization engine 120 or ML modeling engine 130 in one or more iterative cycles.

Any or each engine of system 100 may be a module (e.g., a program module), which may be a packaged functional hardware unit designed for use with other components or a part of a program that performs a particular function (e.g., of related functions). Any or each of these modules may be implemented using a computing device. In some of the disclosed methods, systems, or apparatuses, the functionality of system 100 may be split across multiple computing devices to allow for distributed processing of the data, which may improve output speed and reduce computational load on individual devices. In some of the disclosed methods, systems, or apparatuses, system 100 may use load-balancing to maintain stable resource load (e.g., processing load, memory load, or bandwidth load) across multiple computing devices and to reduce the risk of a computing device or connection becoming overloaded. In these or other of the disclosed methods, systems, or apparatuses, the different components may communicate over one or more I/O devices and/or network interfaces.

System 100 can be related to different domains or fields of use. Descriptions of the disclosed methods, systems, or apparatuses related to specific domains, such as language processing or language modeling, is not intended to limit the disclosed methods, systems, or apparatuses to those specific domains, and the disclosed methods, systems, or apparatuses can apply to any domain that utilizes predictive modeling based on available data.

FIG. 2 is a flowchart that describes a computer-implemented method 200 for generating and executing function calls using a machine learning model, according to some of the disclosed methods, systems, or apparatuses. The process shown in FIG. 2, or any of its constituent steps, may be implemented using an operating environment (e.g., operating environment 900 as discussed in connection with FIG. 9), a system (e.g., system 100 as discussed in connection with FIG. 1), or any component thereof. The steps illustrated in FIG. 2 are exemplary and steps may be added, merged, divided, duplicated, repeated (e.g., as part of a machine learning process), modified, performed sequentially, performed in parallel, and/or deleted in some of the disclosed methods, systems, or apparatuses.

In some of the disclosed methods, systems, or apparatuses, at 210, the computer-implemented method 200 may include receiving an input (e.g., a language input) provided by a user, wherein the input includes a request to perform a computational task within a computing environment. An input provided by a user may refer, e.g., to text or voice input including one or more of a language character, string, phrase, or sentence. The input may include a request, e.g., in a language, to perform one or more computational tasks. A computational task may refer to a specific problem that can be solved, or process(es) that can be performed, using a computer or other computational devices. A computational task may involve processing and manipulating data or information through a series of instructions or algorithms. Computational tasks may range from simple calculations and data analysis to complex simulations, modeling, and problem-solving activities. Computational tasks may require the use of software, programming, external application programming interfaces (APIs), or specialized hardware to perform corresponding processes. Computational tasks may involve mathematical calculations, data processing, image recognition, text analysis, simulations, and other computer-implemented processes. Computational tasks may include, e.g., retrieving information from an application or data source that contains the relevant information, providing a query to a database and receiving an output from the database, analyzing or summarizing information from an application or data source, answering questions by calling external tools, or extracting or collecting information from one or more applications or data sources. A computing environment may refer to any combination of hardware, software, and infrastructure in which computational tasks may be executed. For example, a computing environment may include the Internet, an intranet, or any other public or private network of computing systems, applications, databases, memories, and/or interfaces.

The received request may be, e.g., a request to perform an action, a request for information, or a question or inquiry posed by a user. For example, the input may include a request to send a communication to a person (e.g., "Email Anya to see if she wants to get coffee next Friday"), a request for weather information (e.g., "What's the weather like in Boston?"), a request for customer information (e.g., "Who are my top ten customers this month?"), or a request for extracted information (e.g., "Which people are mentioned in this article?"). A user may refer to an individual, an application, an interface, or a computing device. For example, an individual may provide the request via a user interface (e.g., a graphical user interface). As another example, an application or a computing device may provide the request via an API associated with the machine learning model (e.g., an application may be programmed to forward an individual user request received by the application, along with additional information, such as, e.g., a template function, to a machine learning model). The request may or may not include an indication of a particular external application that may be used to perform the computational task. If the request includes such an indication, a machine learning model may determine that a function call associated with that particular external application is being requested. If the request does not include such an indication, a machine learning model may be implemented to identify a particular external application to be used to perform the computational task based on the received input. Further, in some embodiments, the request may include a request for output comprising a populated function call. For example, the machine learning model may determine, based on the received input, that a user wants the model to return a function call without the function being given directly in the received input (in other embodiments, the function may be directly provided by the user). The machine learning model may then, e.g., identify a function call based on the received input or look up the function call syntax in a memory, a database, or online, and return a populated function call (e.g., a function populated with values for any arguments of the function). The user, in turn, may utilize the outputted populated function call by, e.g., making an API call to the external application or tool (e.g., without the machine learning model doing so).

In some embodiments, e.g., when the user is an application or a computing device, the application or computing device may be configured (e.g., with programming code) to send a plurality of inputs to the machine learning model. For example, an application may be programmed to call the machine learning model repeatedly, based on an instruction (e.g., a single instruction) received by the application or computing device. For example, the application or computing device may be configured by receiving programming code including instructions (e.g., via a particular input field) regarding whether the application or computing device should request, when employing the machine learning model, for the model to output a function call (e.g., an input field that defines whether or not the function call must be generated by the machine learning model). Based on the given instruction regarding a requested output of the machine learning model, the application or computing device may be configured to repeatedly request a function as output based on programming instructions (or not to request a function as output based on the same) either continuously or periodically, e.g., based on a condition provided in the programming instructions). The programming instructions may, e.g., be input only once to the application or computing device. A user of the application or computing device may thereby provide various inputs to the application or computing device, and the application or computing device may repeatedly request functions as output from the machine learning model based on multiple and different user inputs received over time.

In some embodiments, the application or computing device may be configured by receiving programming instructions (e.g., code) that include a particular function and additional information related to the particular function (e.g., instructions for determining particular argument values, instructions to call the function based on particular user input received, instructions regarding the external tool or application to call with the function). For example, once configured (e.g., by receiving the programming code once), the application may repeatedly utilize the particular function alongside the additional information provided in the programming code to, e.g., repeatedly make the function call, as generated by the machine learning model, to an external tool or application that is also identified in the instruction code.

Referring further to FIG. 2, at 220, computer-implemented method 200 may include employing a machine learning model to process the received input, wherein the machine learning model is trained to convert the input into an output comprising a structured representation of the computational task or another type of output that represents the computational task. Processing the received input may involve converting the input into an output comprising a structured representation. A structured representation may refer to a systematic and organized format representing the input that captures the underlying semantics and relationships within the input (e.g., text, captured speech, etc.). In some of the disclosed methods, systems, or apparatuses, the structured representation may include one or more parameters, variables, or operations for executing the computational task. A structured representation may further include a semantic graph, a syntax tree, an entity-relationship model, semantic role labeling, tokens, word embeddings, ontologies, logical forms, or other analytical or model-defined representations of the received input. Other types of output that represent the computational task may include, e.g., textual outputs (such as, e.g., natural language descriptions, formats like JSON or XML, or pseudocode), visual representations (such as, e.g., flowcharts, graphs, or annotated images), executable code (e.g., in programming languages or command-line scripts), numerical outputs (such as, e.g., raw numbers, matrices, or tables), procedural outputs (such as, e.g., step-by-step instructions or guidance), multimodal outputs (e.g., combinations of text and visual outputs), or logical or mathematical representations (such as, e.g., equations, formulas, or proofs).

In some of the disclosed methods, systems, or apparatuses, the received input may include at least two requests to perform different computational tasks or functions, either in a particular order or simultaneously. For example, the received input may include a first request for weather information and a second request for ticketing information (e.g., the received input may be, "What tours are available in Washington this weekend, and what is the weather going to be like?"). In some of the disclosed methods, systems, or apparatuses, the machine learning model may be trained to identify and classify different computational tasks or functions based on the received input. Continuing the example above, the machine learning model may be trained to identify a first computational task regarding obtaining tour information in Washington this weekend, and a second computational task regarding obtaining weather information in Washington this weekend, as well as classifying the first and second computational tasks into distinct categories given their differences. In some of the disclosed methods, systems, or apparatuses, the machine learning model may include a pre-trained language model. A pre-trained language model may refer to any type of artificial intelligence model that has been trained on a large dataset including, e.g., text data, to learn the intricacies of a language, including grammar, semantics, and contextual relationships (e.g., a generative pre-trained transformer). In some of the disclosed methods, systems, or apparatuses, the pre-trained language model may be employed to identify and classify different computational tasks or functions based on the received input or based on the output representing the computational task.

In some of the disclosed methods, systems, or apparatuses, the structured representation or other output representing the computational task may further include information associated with the received input. In some of the disclosed methods, systems, or apparatuses, the information may include data specific to the user providing the input. In some of the disclosed methods, systems, or apparatuses, the structured representation may further include metadata, annotations, or comments associated with the input or the user providing the input.

In some of the disclosed methods, systems, or apparatuses, the computer implemented method 200 may include receiving an additional user input in response to one or more prompts generated by the machine learning model based on the processed input. In some of the disclosed methods, systems, or apparatuses, the structured representation output by the machine learning model may be based further on processing the additional user input prior to outputting the structured representation. Such a step may be useful when the machine learning model cannot generate a structured representation of the computational task with sufficient confidence based on the initially received input alone. By further prompting a user and receiving additional user input, the machine learning model may receive additional data associated with a desired computational task in order to generate an accurate structured representation.

In some of the disclosed methods, systems, or apparatuses, and referring further to FIG. 2, at 230, computer-implemented method 200 may include determining, based on the output, and using the machine learning model or an additional machine learning model, to generate and execute a function call to perform the computational task. A function call may refer to an act of invoking or executing a function within (or with respect to) a program. A function may refer to one or more self-contained blocks of programming code designed to perform specific tasks or computations with respect to a program. A function may include parameters or variables that allow the function to be reusable (e.g., re-executable) based on varying input as provided via additional data with the function. The parameters or variables may be based on information provided in the structured representation or other output representing the computational task. Non-limiting examples of function calls include requesting connectivity with an API, requesting information or extracting data from an API, modifying data via an API, and/or sending data to an API. In some of the disclosed methods, systems, or apparatuses, the function call may include a function (or more than one function) and at least one argument associated with the function. A function may be configured to accept one or more arguments. Other functions may be configured to accept no arguments, or they may be configured to operate without requiring an argument.

An argument may refer to a value or expression that is provided in addition to and associated with the function when it is invoked or called. The argument may be used to pass data to the function, which, without the argument, contains one or more placeholders for specific data (e.g., a variable or parameter). By passing data to the function, the argument may replace the one or more placeholders in the function such that, when called or invoked, e.g., via an API, the converted function causes specific operations based on the passed data. The generated argument may be used to customize the behavior of the function, allowing the function call to be invoked with particular data and to perform different operations based on the received input and the structured representation or other output representing the computational task.

Determining to generate a function call may refer to an act of recognizing a request within the input that may require the execution of a function to perform the computational task indicated by the input. Determining to generate a function call may also refer to calculating a probability based on a predetermined decision boundary (e.g., a decision boundary that is input, or trained, into the machine learning model). A decision boundary may refer to a threshold, limit, or cutoff that separates different classes of outcomes identified or generated by the machine learning model, thereby assisting the model to make determinations based on probabilities. The decision boundary may, e.g., represent the dividing line or region where a machine learning model transitions between assigning one label or outcome (e.g., determining that a function call is not required based on the input received) versus another label or outcome (e.g., determining that a function call may be required based on the input received, or that a particular external application or tool should be employed). The decision boundary may take various forms depending on the type of model and the complexity of the data. For example, in linear models like logistic regression models, the decision boundary may be a straight line (in two dimensions) or a hyperplane (in higher dimensions). In more complex models such as, e.g., support vector machines or neural networks, the decision boundary may be non-linear, e.g., curving to fit certain patterns in data. Decision boundaries also may be fixed or variable; for example, in probabilistic models, a threshold (or multiple thresholds) used to classify (e.g., determine classes) based on a decision boundary may be adjustable to balance sensitivity and specificity, such as, e.g., by setting the decision boundary at 0.5 (e.g., 50%) for equal probability between classes, or shifting the decision boundary to prioritize one class over another. Additionally, decision boundaries may adapt in real-time, e.g., in models that learn incrementally, or decision boundaries may represent probabilistic regions, such as, e.g., those derived from Bayesian classifiers.

Furthermore, in some embodiments, if a machine learning model is a reasoning model (e.g., a model that applies rules, patterns, or logical inferences to derive conclusions, rather than simply correlating information to make predictions), determining to generate a function call may include determining to call an external tool or application based on reasoning performed by the machine learning model (reasoning may refer to, e.g., simulated logical thinking, or engaging in explicit inference or deduction), and requesting permission (e.g., from a user or application) to call the external tool or application, with or without being previously trained to call the external tool (e.g., the reasoning employed by the model may supplant the need for training the model). Alternatively, or in addition, the model may be post-trained on such capabilities (e.g., based on a determination that a function call may be required). The model may also request permission, e.g., from a user or application, to perform the function call (e.g., provide the function call to an external application or tool via an API).

In some of the disclosed methods, systems, or apparatuses, and referring further to FIG. 2, at 240, computer-implemented method 200 may include generating, based on the determining, and using the machine learning model or the additional machine learning model, the function call. Generating the function call may refer to generating the function and/or generating one or more arguments associated with the function. Generating the function may include accessing a function known to the machine learning model (e.g., based on received user input or stored data, or based on an analysis of the structured representation) and/or identifying a function based on an analysis of the structured representation. Identifying a function may include, e.g., identifying a computational task based on the structured representation, identifying an external application and corresponding API for performing the computational task based on the identified computational task, accessing a specification and/or manifest associated with the identified application and corresponding API, and identifying a function based on the accessed specification and/or manifest and the identified computational task. Various steps for receiving or accessing a manifest and/or specification are described in U.S. patent application Ser. No. 18/186,712, the disclosure of which is incorporated by reference herein in its entirety. In some of the disclosed methods, systems, or apparatuses, a function may be provided by a user to the machine learning model before, after, or along with an input associated with the function. The machine learning model may then understand that the user-provided function is desired and may parse the provided function and input associated with the function to generate and output to the user an argument associated with the user-provided function. Generating one or more arguments associated with the function may also include processing the structured representation of the computational task to determine a specific value to pass into the generated function in place of a variable or placeholder within that function. In some of the disclosed methods, systems, or apparatuses, the function call may include at least one of a script, a code, or a data structure for executing the computational task by invoking the function with its associated argument(s), if any.

In some embodiments, the machine learning model may be configured to respond to a received input by indicating that it could not properly (e.g., correctly or accurately) generate the requested information (e.g., a requested function call), or that additional information may be required in order for the machine learning model to properly generate the requested information. In some embodiments, the machine learning model may be configured to respond to a received input by indicating that it did properly generate the requested information, or that additional information may be helpful if a user would like to improve the model's response. In addition, the machine learning model may be configured to provide a score or rating associated with the model's response (a score may, e.g., be associated with a confidence rating, or a decision boundary, as described herein).

In some of the disclosed methods, systems, or apparatuses, the generated function call may further include version control information. Version control information may refer to data associated with the history of changes made with respect to programming code, such as, e.g., a repository storing programming code or version control information, commit message data, configuration file data, branch data, merge data, checkout data, or conflict data. Version control information may be used to manage, maintain, or indicate changes to code associated with functions or arguments, to collaborate with others, or to revert to previous versions of code if needed. In some of the disclosed methods, systems, or apparatuses, the generated function call may further include logic for dynamically modifying the computational task based on real time data or changing conditions. Such logic may refer to programming code that adapts to an evolving environment, such as, e.g., rule-based logic, fuzzy logic, or event-driven logic. Real time data or changing conditions may refer to server load metrics, live traffic flow information, power consumption data, sensor data, browsing history data, user behavior data, stock or market prices, activity levels, weather data, calendar data, time data, or any other data or conditions that change over time. In some of the disclosed methods, systems, or apparatuses, the generated function call may include security measures to protect sensitive data or operations within the executed computational task or function. Security measures may refer to programming code that acts to prevent vulnerabilities and to ensure integrity and confidentiality when performing the function call and receiving a response from an external API. Security measures may include, e.g., input validation data, parameterized query language, data type checking data, bounds checking data, function signature protection, code review data, authentication and authorization data, error handling information, code obfuscation techniques, session management information, cryptographic protection, secure communication protocol data, runtime security tools, or dependency scanning tools. In some of the disclosed methods, systems, or apparatuses, the generated function call may further include metadata specifying an expected response format or output structure resulting from the executed function. In some of the disclosed methods, systems, or apparatuses, the generated function call may also include self-updating information for automatically adapting to changes in data sources, APIs, or dependencies. Self-updating information may refer to data or parameters that may change dynamically, either within the function or arguments, or due to external factors. Self-updating information may allow the function call to be adaptable to different conditions and may also provide for the output of the most relevant or updated information when the function is executed. Furthermore, self-updating information may allow for the function to be capable of handling changing conditions or requirements without requiring changes to the underlying code of the function or arguments, thereby enabling modularity and maintainability of a generated function call. Self-updating information may include, e.g., time-dependent information, configuration parameters, user-specific information, external API response information, contextual information, environmental variables, dynamic data structure information, state information, triggering event information, version information, or dynamic criteria or condition data.

In some embodiments, the generated function call may further include error handling information. Error handling information may refer to details, strategies, or mechanisms for identifying, managing, and resolving errors that may occur during the operation of a system, process, or application. Error handling information may include descriptions of potential errors, such as invalid inputs, system malfunctions, or unexpected conditions, along with predefined actions or responses to mitigate their impact. For instance, error handling information may outline how to log errors for debugging, provide user-friendly error messages, or implement fallback procedures to maintain system stability. Error handling information may also include guidelines for retrying failed operations, escalating issues to higher-level processes, or safely terminating affected components to prevent further problems. Error handling information may also specify exceptions, error codes, or conditions that trigger corrective actions, ensuring that the system remains robust and continues to function effectively despite disruptions.

In some of the disclosed methods, systems, or apparatuses, the generated function call may be converted into an executable code in a programming language suitable for the computing environment in which the computational task or function is to be executed. For example, the generated function call may be converted into PYTHON, JAVA, C++, JAVASCRIPT, HTML, RUBY, YAML, JASN, or PHP (e.g., embedded HTML).

In some of the disclosed methods, systems, or apparatuses, the method 200 may further include verifying a correctness of the generated function call before the executing of the function. A correctness may refer to the degree to which a system, process, or output meets its intended purpose, adheres to predefined specifications, or produces the expected results without errors. The correctness may represent the accuracy or reliability of an outcome or behavior relative to a standard or desired result. For example, correctness might refer to the accuracy of a function call as generated based on input data. Correctness may also be context-dependent and may involve both functional correctness (e.g., whether an API call worked as intended) and logical correctness (e.g., whether the underlying logic of the generated function call aligned with the solution to the computational task). In some embodiments, verifying the correctness may lead to a determination that the generated function call was incorrect (e.g., if the determined correctness is below a threshold value). In such cases, the machine learning model may further provide an output that indicates that the generated and sent function call is incorrect. In some embodiments, the machine learning model may be configured not to output the generated function based on a failed verification of correctness.

In some of the disclosed methods, systems, or apparatuses, and referring further to FIG. 2, at 250, computer-implemented method 200 may include sending the function call to an external application programming interface (API) to execute the function with the at least one argument, if also generated. In some embodiments, the function call may be sent to the user, wherein the user executes the function call (e.g., by passing the function call to an external application or tool via an external API). An external API may refer to a set of rules, protocols, and/or tools provided by an external organization or service provider for interaction with their services, systems, or data. External APIs may also allow application developers to access and integrate services, features, or data outside of the external API into their own applications or systems, enabling them to extend their functionality or leverage external resources. External APIs, which may typically be made available over the internet, may be accessed by a system, machine learning model, or user via the internet. Executing the function with the at least one argument may include passing the generated function and/or the generated argument(s) to an external API to request a response from the external API. The request may be related to the computational task determined from the input received at step 210. A user receiving the populated function call, for example, may execute the populated function call by passing it to an external API associated with an external application or tool. As another example, an application configured to communicate with the machine learning model and receiving the populated function call may execute the populated function call, as provided by the machine learning model, by passing it to an external API.

In some of the disclosed methods, systems, or apparatuses, and referring further to FIG. 2, at 260, computer-implemented method 200 may include receiving a response from the external API based on the executed function call. In some of the disclosed methods, systems, or apparatuses, the received response may be provided in a script, code, or other non-language data structure. In other of the disclosed methods, systems, or apparatuses, the received response may be provided, e.g., in a language. The received response may include variable data based on the function call and associated argument(s). The received response may also include multiple responses from the external API based on the number of function calls or the type of function sent to the API.

In some of the disclosed methods, systems, or apparatuses, and referring further to FIG. 2, at 270, computer-implemented method 200 may include sending the received response to the machine learning model or an additional machine learning model, wherein the machine learning model or the additional machine learning model generates an output (e.g., a language output or a non-language output) based on the received response. Generating an output may refer to converting an API response provided in programming language to a language string having a meaning similar to the programming language. For example, generating the output may include converting programming language into one or more words, sentences, paragraphs, phrases, or other compilation of alphanumeric characters understandable to a human user.

In some of the disclosed methods, systems, or apparatuses, and referring further to FIG. 2, at 280, computer-implemented method 200 may include sending the output to the user, at least one processor, another machine learning model, or another system. In some of the disclosed methods, systems, or apparatuses, the method 200 may further include presenting the received response from the external API to the user via a user interface. A user interface may enable users to communicate with the language model in a more human-like manner, making it easier to perform tasks, ask questions, and receive information in response to input. A user interface may include, e.g., a text-based interface, a voice-activated interface, a conversational interface, a command-line interface, a web interface, a virtual reality or augmented reality interface, a mobile application interface, or an email or text message interface.

Figure 3:
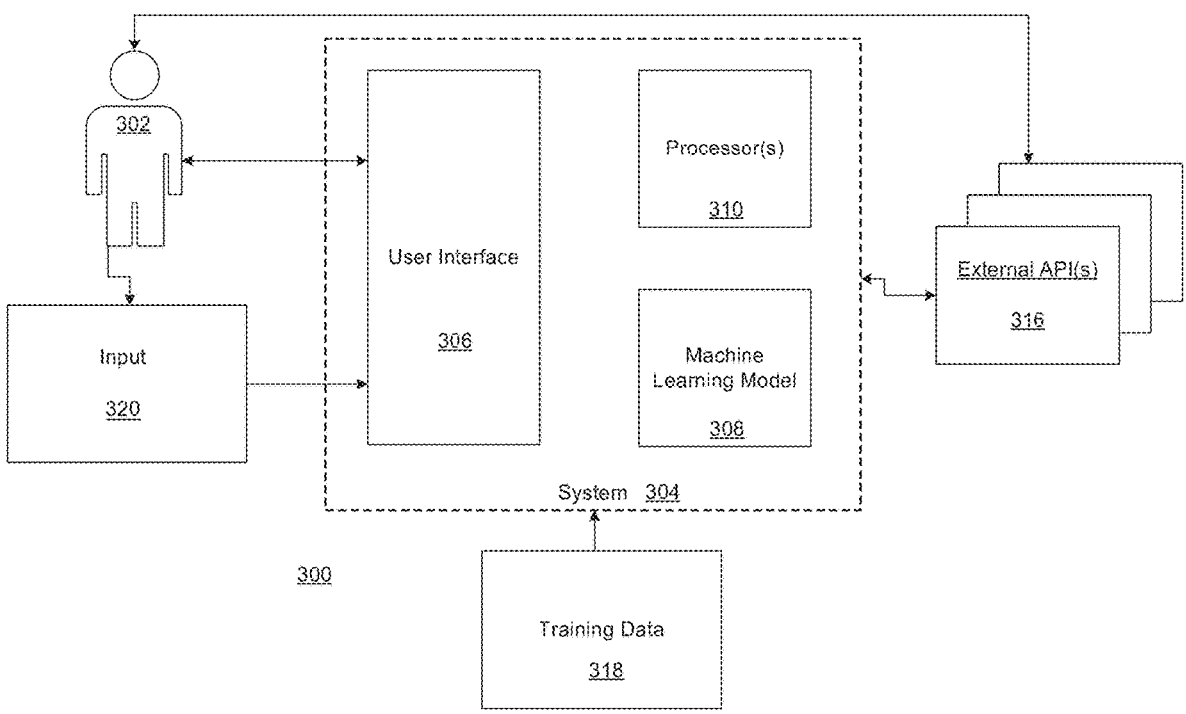
FIG. 3 illustrates an exemplary operating environment for generating and executing function calls, according to some of the disclosed methods, systems, or apparatuses.

FIG. 3 is a block diagram that describes an exemplary operating environment 300 for implementing the method of FIG. 2 and for generating and executing function calls using a machine learning model, according to some of the disclosed methods, systems, or apparatuses.

In some of the disclosed methods, systems, or apparatuses, operating environment 300 may include system 304 comprising at least one memory storing instructions (not shown), at least one processor 310 configured to execute the instructions to perform a set of operations for generating and executing function calls. The set of operations may, e.g., include the steps of method 200 described herein. As such, system 304 may be configured for receiving an input 320 provided by a user 302, wherein the input 320 includes a request to perform a computational task within a computing environment. It will be understood that a user may also refer to an application or other software that is, e.g., associated with a user, and that the associated application or other software may provide input 320, e.g., via an API call, to the system or to an element thereof. User 302 may provide input 320 to a user interface 306 of system 304. User 302 may also provide other types of input to system 304 via user interface 306. System 304 may further include a machine learning model 308. Machine learning model 308 may be trained using training data 318. Furthermore, one or more external APIs 316 may be accessed either by user 302, as shown in FIG. 3, or by system 304.

In some of the disclosed methods, systems, or apparatuses, system 304 may be a single device (e.g., computer device 902) or multiple devices. System 304 may also be configured for employing machine learning model 308 to process the received input 320, wherein machine learning model 308 is trained to convert the input 320 into an output comprising a structured representation of the computational task, wherein the structured representation includes one or more parameters, variables, or operations for executing the computational task. Further, system 304 may be configured for determining, based on the output, and using machine learning model 308 or an additional machine learning model, to generate a function call to perform the computational task, the function call including a function and/or at least one argument associated with the function. System 304 may also be configured for generating, based on the determining, and using machine learning model 308 or the additional machine learning model, the function call, the function call including at least one of a script, a code, or a data structure for executing the computational task. System 304 may further be configured for sending the function call to an external application programming interface (API) to execute the function with the at least one argument. System 304 may also be configured for receiving a response from the external API based on the executed function. Further, system 304 may be configured for sending the received response to machine learning model 308 or an additional machine learning model, wherein machine learning model 308 or the additional machine learning model generates an output based on the received response. System 304 may further be configured for sending the output to the user.

Figure 4:
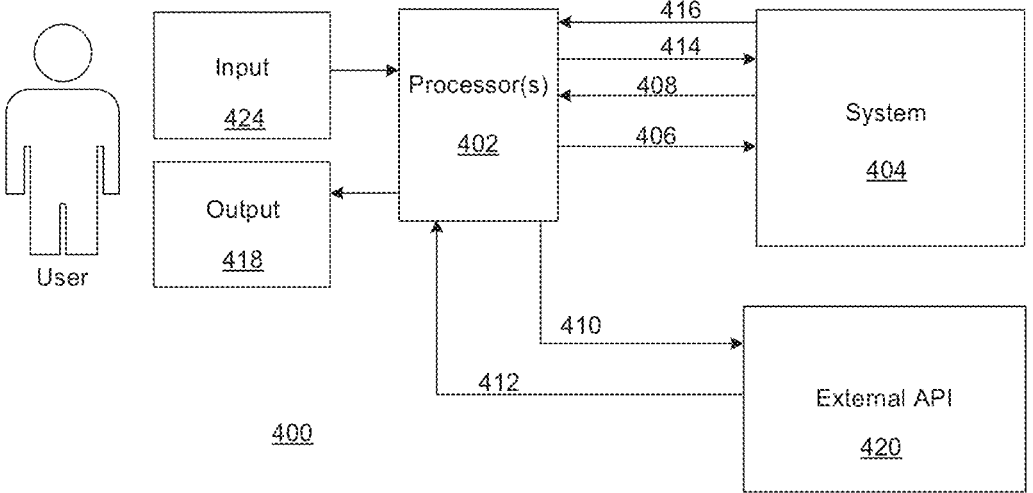
FIG. 4 illustrates another exemplary operating environment for generating and executing function calls, according to some of the disclosed methods, systems, or apparatuses.

FIG. 4 is a block diagram that describes another exemplary operating environment 400 for implementing the method of FIG. 2 and for generating and executing function calls using a machine learning model, according to some of the disclosed methods, systems, or apparatuses.

In some of the disclosed methods, systems, or apparatuses, operating environment 400 may include system 404 comprising at least one memory storing instructions (not shown), at least one processor (not shown) configured to execute the instructions to perform a set of operations for generating and executing function calls, and a machine learning model (not shown).

Operating environment 400 may further include one or more processors 402 (i.e., one or more processors external to system 404) and one or more external APIs (e.g., external API 420). The set of operations may, e.g., include steps for generating and executing function calls. System 404 may be configured for receiving inputs 406, 414 from processor(s) 402 and providing respective outputs 408, 416 based on received inputs 406, 414. Processor(s) 402 may provide inputs 406, 414 based, at least in part, on an input 424 received from a user. In some of the disclosed methods, systems, or apparatuses, input 424 may include a request for the performance of a computational task in a computing environment. Processor(s) 402 may parse the language to determine a context associated with the computational task requested in input 424. Context may refer to any one of relationships between individual or grouped terms within language, semantic meanings of terms or sentences within language, grammatical formats or other arrangements of language, or another determined characteristic of language based on processing or analyzing the language. The context may, in turn, be passed to system 404 as part of input 406. Processor(s) 402 may further determine one or more functions based on the determined context and pass the one or more functions to system 404 as part of input 406. Alternatively, system 404 may determine the one or more functions without requiring the one or more functions as part of input 406. In response to receiving input 406, system 404 may provide output 408 to processor(s) 402.

Output 408 may include the one or more functions and one or more arguments associated with the one or more functions. System 404 (via, e.g., the machine learning model) may generate the one or more arguments for each function based on the context received as part of input 406. Based on output 408, processor(s) 402 may further provide a function call 410 to external API 420, and external API 420 may provide a response 412 based on function call 410. Based on response 412, processor(s) 402 may provide a second input 414 to system 404. Second input 414 may include data from response 412. In response to receiving second input 414, system 404 may provide a second output 416 to processor(s) 402. Second output 416 may include language data based on the data received in second input 414. Alternatively, processor(s) 402 may convert the data from response 412 into language data without passing the data from response 412 to system 404 and without receiving second output 416 from system 404. Finally, processor(s) 402 may provide the language data as an output 418 to the user. In some of the disclosed methods, systems, or apparatuses, processor(s) 402 may be associated with a language model and/or language model user interface. In some of the disclosed methods, systems, or apparatuses, the language model and/or system 404 may be a single device (e.g., computer device 902) or multiple devices.

With further reference to FIG. 4, processor(s) 402 may be configured to process input 424, wherein the language model is trained to convert input 424 into input 406, wherein input 406 includes an output that represents the computational task, and wherein the output includes one or more parameters, variables, or operations for executing the computational task. Further, system 404 may be configured for determining, based on input 406, and using the machine learning model of system 404 or an additional machine learning model, to generate a function call to perform the computational task, the function call including a function and at least one argument associated with the function. System 404 may also be configured for generating, based on the determining, and using the machine learning model of system 404 or the additional machine learning model, the function call, the function call including at least one of a script, a code, or a data structure for executing the computational task. System 404 may further be configured for sending the function call, as part of output 408, to processor(s) 402. Further, processor(s) 402 may be configured to send the function call, as function call 410, to external API 420, in order to execute the function with the at least one argument. Processor(s) 402 may also be configured for receiving a response 412 from external API 420 based on the executed function. Further, processor(s) 402 may be configured for sending the received response 412 to system 404, wherein the machine learning model of system 404 or an additional machine learning model generates an output based on the received response.

Figure 5:
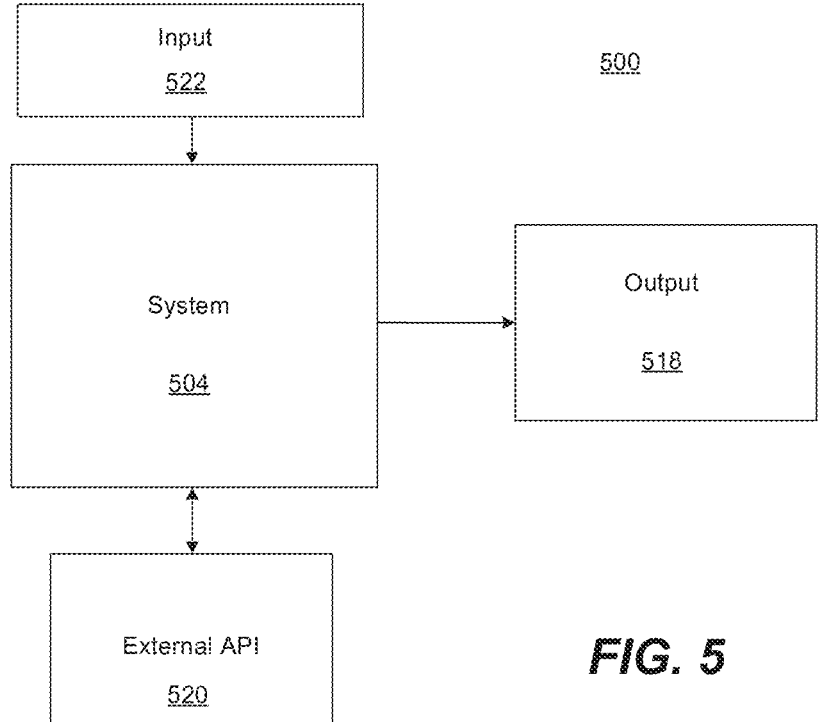
FIG. 5 illustrates yet another exemplary operating environment for generating and executing function calls, according to some of the disclosed methods, systems, or apparatuses.

FIG. 5 is a block diagram that describes another exemplary operating environment 500 for implementing the method of FIG. 2 and for generating and executing function calls using a machine learning model, according to some of the disclosed methods, systems, or apparatuses.

In some of the disclosed methods, systems, or apparatuses, operating environment 500 may include system 504 comprising at least one memory storing instructions (not shown), at least one processor (not shown) configured to execute the instructions to perform a set of operations for generating and executing function calls, a user interface (not shown), a language model (not shown), and a machine learning model (not shown). System 504 may refer, e.g., to system 304 of FIG. 3. Operating environment 500 may further include one or more external APIs 520 (e.g., external API(s) 316 of FIG. 3). The set of operations performed by the processor may include, e.g., steps similar to those of method 200 for generating and executing function calls using machine learning. Accordingly, system 504 may be configured for receiving input 522, processing input 522, determining to generate a function call, generating the function call based on the processing of input 522, passing the function call to external API 520, and generating an output 518 based on a response received from external API 520 in reference to the executed function call. Receiving input 522 may include, e.g., receiving an input provided by a user, wherein the input includes a request to perform a computational task within a computing environment, as described with respect to method 200 and FIG. 2. Processing input 522 may include, e.g., employing a machine learning model to process the received input, wherein the machine learning model is trained to convert the input into an output comprising a structured representation of the computational task, as described with respect to method 200 and FIG. 2. Determining to generate a function call may include, e.g., determining, based on a structured representation or other output representative of input 522, and using a machine learning model, to generate and execute a function call to perform the computational task, as described with respect to method 200 and FIG. 2. Generating the function call may include, e.g., generating, based on the determination and the processing of input 522, and using the machine learning model, the function call, which may include a function and one or more arguments, as described with respect to method 200 and FIG. 2. Passing the function call to external API 520 may include, e.g., sending the function call to an external API to execute the function with the one or more arguments, if also generated, as described with respect to method 200 and FIG. 2. Generating output 518 may include, e.g., receiving a response from the external API based on the executed function, generating an output based on the received response, and sending the output to the user, at least one processor, another machine learning model, or another system, as described with respect to method 200 and FIG. 2.

FIG. 6 is a flowchart that describes another computer-implemented method 600 for generating and executing function calls using a machine learning model, according to some of the disclosed methods, systems, or apparatuses. The process shown in FIG. 6, or any of its constituent steps, may be implemented using an operating environment (e.g., operating environment 900 as discussed in connection with FIG. 9), a system (e.g., system 100 as discussed in connection with FIG. 1), or any component thereof. The steps illustrated in FIG. 6 are exemplary and steps may be added, merged, divided, duplicated, repeated (e.g., as part of a machine learning process), modified, performed sequentially, performed in parallel, and/or deleted in some of the disclosed methods, systems, or apparatuses.

In some of the disclosed methods, systems, or apparatuses, at 610, computer-implemented method 600 may include receiving a user query in a language and a function specification. A function specification may refer to a detailed description of a function in a programming context, which may provide information about the function's purpose, input parameters, output values, and any potential side effects, all without requiring the analysis of the function's source code. While a user may provide a complete function specification as input, a user may also provide a reference to or indicate a particular function specification, which may be located, e.g., at an online location that is accessible to a machine learning model. Various steps for receiving or accessing a function specification are disclosed in U.S. patent application Ser. No. 18/186,712, the disclosure of which is incorporate by reference herein in its entirety. A function specification may include any or all of the following components: function name, function purpose, function description, input parameters (e.g., acceptable inputs, valid ranges of inputs, acceptable data types, constraints on input), return values (e.g., return value types, meanings of return values), exceptions, errors (e.g., potential errors raised by the function, error handling information, how errors are communicated), side effects (e.g., unintended changes or actions caused by the function), preconditions (e.g., conditions which may be required prior to calling the function, or assumptions made by the function), postconditions (e.g., state or conditions that will be true after the function is successfully executed), usage examples (e.g., valid inputs and expected outputs), dependencies (e.g., external libraries, resources, or modules relied upon by the function), and/or implementation information (e.g., additional information related to the function's implementation).

At step 620, method 600 may include using the received user query and function specification to request a first response from a machine learning model, the first response including a model-generated function call. A model-generated function call may include at least one function and/or at least one argument associated with the at least one function. The at least one function may be based on and may adhere to the received, referenced, or indicated function specification. The at least one function may further be based on the received user query (e.g., a user may indicate a desired functionality in the language query, and based on the indicated functionality, a function may be identified for implementation). The at least one argument associated with the at least one function may be based on the received user query and may also adhere to the received, referenced, or indicated function specification.

At step 630, method 600 may include passing the first response from the machine learning model to an external API as a request to receive a response from the external API and receiving the response from the external API. Passing the first response from the machine learning model to an external API may include, e.g., sending a generated function call to an external API to execute the generated function with one or more arguments, if also generated, as described with respect to method 200 and FIG. 2. Receiving the response from the external API may include, e.g., receiving a response from the external API based on the executed function call, as described with respect to method 200 and FIG. 2, or receiving any sent data or information from the external API in reply to the executed function call.

At step 640, method 600 may include sending the received response from the external API to the machine learning model (or to another machine learning model) to receive a second response from the machine learning model (or other machine learning model). The second response may include model-generated output that is responsive to the received user query. The output may be generated by the machine learning model by converting relevant data within the response from the external API, as passed to the machine learning model, into language data.

At step 650, method 600 may include sending the output to a user, at least one processor, another machine learning model, or another system. Sending the output may include, e.g., sending the output as described with respect to method 200 and FIG. 2.

FIG. 7 is a flowchart that describes another computer-implemented method 700 for generating and executing function calls using a machine learning model, according to some of the disclosed methods, systems, or apparatuses. The process shown in FIG. 7, or any of its constituent steps, may be implemented using an operating environment (e.g., operating environment 900 as discussed in connection with FIG. 9), a system (e.g., system 100 as discussed in connection with FIG. 1), or any component thereof. The steps illustrated in FIG. 7 are exemplary and steps may be added, merged, divided, duplicated, repeated (e.g., as part of a machine learning process), modified, performed sequentially, performed in parallel, and/or deleted in some of the disclosed methods, systems, or apparatuses.

In some of the disclosed methods, systems, or apparatuses, at 710, computer-implemented method 700 may include receiving database schema data associated with a database, a function specification, and a user query. Receiving a user query may refer to receiving an input provided by a user, as described with respect to method 200 and FIG. 2. Receiving database schema data or a function specification may refer to receiving such data directly as additional user input, accessing such data based on additional user input received, or accessing such data without receiving additional user input. For example, a user may directly input, in addition to a query in language, particular database schema data associated with a database of interest or the programming code of a particular function that the user may want the machine learning model to utilize. As another example, a user may input additional information that references a particular database schema, function specification, or an online location of such data, and the machine learning model may obtain the referenced data by accessing a known location of the referenced data or the online location provided by the user (e.g., a specification associated with an external API and published in an online location). As yet another example, the machine learning model may determine the online location of database schema information or function specification data based on the received user query itself (e.g., by parsing the user query and processing the structured representation of the requested computational task) without requiring additional input from the user. Database schema data may refer to any data that indicates the structure or organization of a database, including its tables, fields, columns, relationships, views, data types, constraints, stored procedures or triggers, and/or indexes. A function specification may refer to any data that outlines the intended behavior, features, and functionality of a specific software function, including, e.g., its purpose, scope, requirements, use cases, dependencies, assumptions, constraints, data flow diagrams, security requirements, performance requirements, and/or acceptance criteria. By receiving the database schema data and/or the function specification, the machine learning model may be enabled to generate a function call in view of the database schema data or function specification and based on the received user query, wherein the generated function call complies with any requirements or conditions associated with the particular database or function associated with the user query.

Referring further to FIG. 7, at step 720, method 700 may include generating a response based on the user query, the response including a function call. The function call may include at least one function and/or at least one argument associated with the at least one function, wherein the function and argument adhere to both the function specification and the database schema data. Generating a response based on the user query may include, e.g., generating a function call, as described with respect to method 200 and FIG. 2. Generating a response may further be based on the received database schema data or the received function specification. For example, the generated response may include a function call that includes a function as provided by the user (as additional input) and an argument for that function, wherein the machine learning model generates the argument based on an analysis of the received database schema data, such that the argument is provided in a format that is comprehensible to the corresponding database.

Referring further to FIG. 7, at step 730, method 700 may include passing the generated response to an API associated with the database and receiving a response from the API (or database). Passing the generated response may include, e.g., sending a generated function call to an external API to execute the generated function with one or more arguments, if also generated, as described with respect to method 200 and FIG. 2.

Referring further to FIG. 7, at step 740, method 700 may include sending the received response from the API (or database) to a user, at least one processor, another machine learning model, or another system. Sending the received response to a user may include, e.g., sending the received response to a machine learning model, wherein the machine learning model may generate an output based on the received response, and wherein the output may further be sent to the user, as described with respect to method 200 and FIG. 2.

FIG. 8 is a flowchart that describes another computer-implemented method 800 for configuring an agent for generating and executing function calls using a machine learning model, according to some of the disclosed methods, systems, or apparatuses. The process shown in FIG. 8, or any of its constituent steps, may be implemented using an operating environment (e.g., operating environment 900 as discussed in connection with FIG. 9), a system (e.g., system 100 as discussed in connection with FIG. 1), or any component thereof. The steps illustrated in FIG. 8 are exemplary and steps may be added, merged, divided, duplicated, repeated (e.g., as part of a machine learning process), modified, performed sequentially, performed in parallel, and/or deleted in some of the disclosed methods, systems, or apparatuses.

In some of the disclosed methods, systems, or apparatuses, at 810, computer-implemented method 800 may include receiving at least a first function and a second function. Receiving a first function or a second function may refer to receiving a function as input (e.g., as a source code of the function). Receiving a function may also refer to accessing the function from a database or online location based on instructions received from a user. A function, as described elsewhere herein, may refer to one or more self-contained blocks of programming code designed to perform specific tasks or computations with respect to a program (see the description of FIG. 2). The first and second function may be associated with the same external API, or the functions may be unrelated or associated with different external APIs.

Referring further to FIG. 8, at step 820, method 800 may include configuring an agent based on the received functions, the agent being associated with a knowledge base. Configuring an agent may refer to the setting up or customizing of a software agent to perform specific tasks or functions within a system by providing the software agent with configuration data including the first function and the second function. A software agent may refer to a software component or module that acts autonomously or semi-autonomously to carry out predefined functions or tasks on behalf of a user, system, or another application and with respect to a knowledge base (e.g., a collection of data or information). For example, the software agent may be a chat bot or a virtual assistant which, e.g., aids users accessing a particular website or database by providing a separate interface for receiving and answering queries input by the visiting users.

Referring further to FIG. 8, at step 830, method 800 may include receiving a user query at the agent. Receiving a user query may include, e.g., receiving an input provided by a user, as described with respect to method 200 and FIG. 2. At this step, however, the user query may be received at the configured agent. The configured agent may also include or be associated with a machine learning model.

Referring further to FIG. 8, at step 840, method 800 may include determining, at the agent, that a response to the user query may require a function call. Determining that a response may require a function call may include, e.g., determining to generate and execute a function call to perform a computational task associated with the user query, as described with respect to method 200 and FIG. 2. At this step, however, the determining may be performed by the agent, or the agent may be configured to execute a function call to an API associated with a machine learning model to receive such a determination.

Referring further to FIG. 8, at step 850, method 800 may include identifying, at the agent, either the first function or the second function to be used in the function call. Identifying either the first function or the second function may include, e.g., processing the received user query to determine one or more keywords based on the user query, and based on the keywords, identifying which of the two functions is more relevant. Processing may also include, e.g., converting input into an output comprising a structured representation of a computational task (the computational task being indicated by the user query), as described with respect to method 200 and FIG. 2.

Referring further to FIG. 8, at step 860, method 800 may include performing the function call with respect to the knowledge base. Performing the function call may include, e.g., sending the function call to an external API (associated with the knowledge base) to execute the function with the one or more arguments, if also generated, as described with respect to method 200 and FIG. 2.

Referring further to FIG. 8, at step 870, method 800 may include receiving a result based on the performed function call and sending the result to a user in reply to the user query. Receiving a result may include, e.g., receiving a response from an external API based on the executed (e.g., performed) function call, as described with respect to method 200 and FIG. 2. Sending the result may include, e.g., generating an output based on the received response, and sending the output to the user, at least one processor, another machine learning model, or another system, as described with respect to method 200 and FIG. 2.

Figure 9:
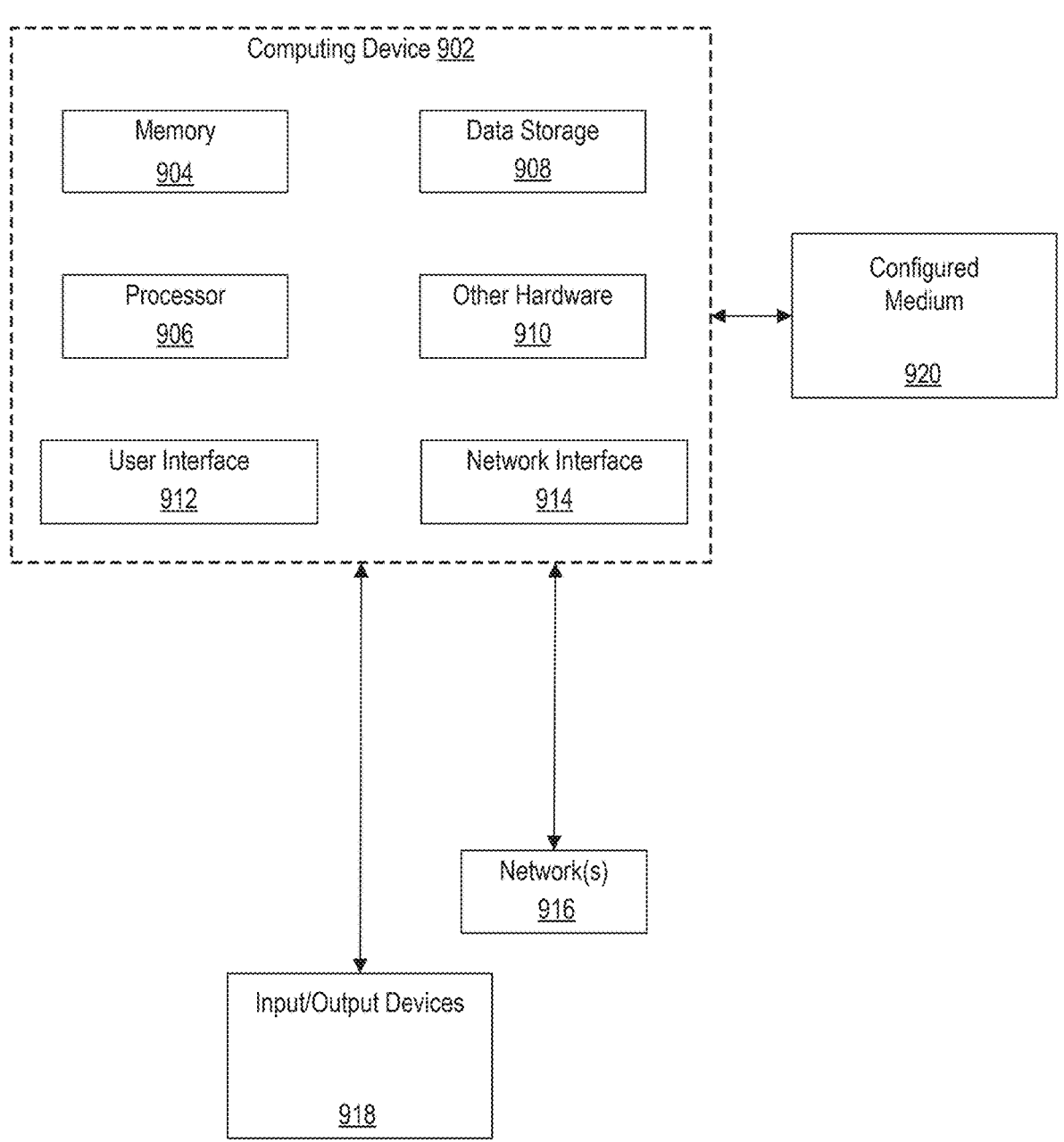
FIG. 9 is a block diagram illustrating an exemplary operating environment for implementing various aspects of this disclosure, according to some of the disclosed methods, systems, or apparatuses.

An exemplary operating environment for implementing various aspects of this disclosure is illustrated in FIG. 9. As illustrated in FIG. 9, an exemplary operating environment 100 may include a computing device 102 (e.g., a general-purpose computing device) in the form of a computer. In some of the disclosed methods, systems, or apparatuses, computing device 102 may be associated with a user. Components of the computing device 102 may include, but are not limited to, various hardware components, such as one or more processors 106, data storage 108, a system memory 104, other hardware 110, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 9, an operating environment 900 includes at least one computing device 902. Computing device 902 may be a uniprocessor or multiprocessor computing device. Operating environment 900 may include one or more computing devices (e.g., multiple computing devices 902) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 902 may be configured for end-users, e.g., with applications, for administrators, as a server, as a distributed processing node, as a special-purpose processing device, or otherwise configured to train machine learning models and/or use machine learning models. In some of the disclosed methods, systems, or apparatuses, multiple computing devices 902 (e.g., a network of GPUs) may be configured to train a machine learning model.

One or more users may interact with the computer system comprising one or more computing devices 902 by using a display, keyboard, mouse, microphone, touchpad, camera, sensor (e.g., touch sensor) and other input/output devices 918, via typed text, touch, voice, movement, computer vision, gestures, and/or other forms of input/output. An input/output device 918 may be removable (e.g., a connectable mouse or keyboard) or may be an integral part of the computing device 902 (e.g., a touchscreen, a built-in microphone). A user interface 912 may support interaction between a disclosed system (or element thereof) and one or more users. A user interface 912 may include one or more of a command line interface, a graphical user interface (GUI), natural user interface (NUI), voice command interface, and/or other user interface (UI) presentations, which may be presented as distinct options or may be integrated. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 918 and computing device 902, based on input received at user interface 912 and/or from network(s) 916. As used throughout, "based on" may refer to being established or founded upon a use of, changed by, influenced by, caused by, dependent upon, or otherwise derived from. In some of the disclosed methods, systems, or apparatuses, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some of the disclosed methods, systems, or apparatuses and part of a system comprising one or more computing devices 902 in other of the disclosed methods, systems, or apparatuses, depending on their detachability from the processor(s) 906. Other computerized devices and/or systems not shown in FIG. 9 may interact in technological ways with computing device 902 or with another system using one or more connections to network 916 via a network interface 914, which may include network interface equipment, such as a physical network interface controller (NIC) or a virtual network interface (VIF).

Computing device 902 includes at least one logical processor 906. The at least one logical processor 906 may include circuitry and transistors configured to execute instructions from memory (e.g., memory 904). For example, the at least one logical processor 906 may include one or more central processing units (CPUs), arithmetic logic units (ALUs), Floating Point Units (FPUs), and/or Graphics Processing Units (GPUs). Computing device 902, like other suitable devices, also includes one or more computer-readable storage media, which may include, but are not limited to, memory 904 and data storage 908. In some of the disclosed methods, systems, or apparatuses, memory 904 and data storage 908 may be part a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 920 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 902, making its content accessible for interaction with and use by processor(s) 906. Removable configured medium 920 is an example of a computer-readable storage medium. Some other examples of computer-readable storage media include built-in random access memory (RAM), read-only memory (ROM), hard disks, and other memory storage devices which are not readily removable by users (e.g., memory 904).

Configured medium 920 may be configured with instructions (e.g., binary instructions) that are executable by processor 906; "executable" is used in a broad sense herein to include machine code, interpretable code, bytecode, compiled code, and/or any other code that is configured to run on a machine, including a physical machine or a virtualized computing instance (e.g., a virtual machine or a container). Configured medium 920 may also be configured with data which is created by, modified by, referenced by, and/or otherwise used for technical effect by execution of the instructions. The instructions and the data may configure the memory or other storage medium in which they reside; such that when that memory or other computer-readable storage medium is a functional part of a given computing device, the instructions and data may also configure that computing device.

Although some disclosed methods, systems, or apparatuses may be described as being implemented as software instructions executed by one or more processors in a computing device (e.g., general-purpose computer, server, or cluster), such description is not meant to exhaust all possible of the disclosed methods, systems, or apparatuses. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some disclosed methods, systems, or apparatuses may include other hardware logic components 910 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components may be grouped into interacting functional modules based on their inputs, outputs, and/or their technical effects, for example.

In addition to processor(s) 906, memory 904, data storage 908, and screens/displays, operating environment 900 may also include other hardware 910, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some of the disclosed methods, systems, or apparatus, other input/output devices 918 such as human user input/output devices (screen, keyboard, mouse, tablet, microphone, speaker, motion sensor, etc.) will be present in operable communication with one or more processors 906 and memory.

In some of the disclosed methods, systems, or apparatuses, the system includes multiple computing devices 902 connected by network(s) 916. Networking interface equipment can provide access to network(s) 916, using components (which may be part of a network interface 914) such as a packet-switched network interface card, a wireless transceiver, or a telephone network interface, for example, which may be present in a given computer system. However, some disclosed methods, systems, or apparatuses may also communicate technical data and/or technical instructions through direct memory access, removable non-volatile media, or other information storage-retrieval and/or transmission approaches.

Computing device 902 may operate in a networked or cloud-computing environment using logical connections to one or more remote devices (e.g., using network(s) 916), such as a remote computer (e.g., another computing device 902). The remote computer may include one or more of a personal computer, a server, a router, a network PC, or a peer device or other common network node, and may include any or all of the elements described above relative to the computer. The logical connections may include one or more LANs, WANs, and/or the Internet.

When used in a networked or cloud-computing environment, computing device 902 may be connected to a public or private network through a network interface or adapter. In some of the disclosed methods, systems, or apparatuses, a modem or other communication connection device may be used for establishing communications over the network. The modem, which may be internal or external, may be connected to the system bus via a network interface or other appropriate mechanism. A wireless networking component such as one comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other manners of establishing a communications link between the computers may be used.

Computing device 902 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may include computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

Data storage 908 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 908 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed methods, systems, or apparatuses include systems, methods, and computer-readable media for the generation and execution of function calls. For example, in some of the disclosed methods, systems, or apparatuses, and as illustrated in FIG. 9, operating environment 900 may include at least one computing device 902, the at least one computing device 902 including at least one processor 906, at least one memory 904, at least one data storage 908, and/or any other component discussed above with respect to FIG. 9.

Some non-limiting practical application examples of methods 200, 600, 700, and 800, and the general disclosure more broadly, are provided below.

In some of the disclosed methods, systems, or apparatuses, the received input may be provided by a user and include, e.g., a request for weather information in a particular location (e.g., What is the weather like in Boston?"). A machine learning model may then process the received input, determine a computational task associated with the input, and convert the input into a structured representation of the computational task. For example, the determined computational task may involve retrieving weather data, and the converted structured representation may include a function associated with retrieving weather data, the function having defined parameters and at least one argument placeholder representing variable data. Based on the structured representation or the determined computational task, the machine learning model may, e.g., be unable to provide an accurate answer to the input without accessing an external data source and therefore determine to generate a function call in order to provide an accurate answer (e.g., to retrieve the weather data from an external API). Based on the determination, the machine learning model may generate a function call that includes a function for retrieving current weather (e.g., "get_current_weather (location: string, unit: 'celsius'|'fahrenheit')") and a generated argument for the function (e.g., "location\":\"Boston, MA\""). The machine learning model may then send the generated function call to an external API (e.g., https://weatherapi.com") to execute the function with its argument by calling the external API with the generated function call. In response to the received function call, the external API may provide a response to the function call (e.g., "temperature": 22, "unit": "celsius", "description": "Sunny"). Based on the response provided by the external API, the machine learning model may generate an output (e.g., "The weather in Boston is currently sunny with a temperature of 22 degrees Celsius"). The output may then be sent to the user or to another processor or system, as the language answer to the received input.

In some of the disclosed methods, systems, or apparatuses, the received input may be provided by a user and may include, e.g., a request for sending a communication to another individual (e.g., "Email Anya to see if she wants to get coffee next Friday"). A machine learning model may then process the received input, determine a computational task associated with the input, and convert the input into a structured representation of the computational task. For example, the determined computational task may involve accessing an email application to draft and send an email to a particular individual, and the converted structured representation may include a function associated with drafting and sending the email, the function having defined parameters and at least one argument placeholder representing variable data (e.g., the variable data may include the intended recipient of the email, the text within the email, or another variable value). Based on the structured representation or the determined computational task, the machine learning model may determine that an external application (e.g., the email application) may be required for performing the user-requested task. In turn, the machine learning model may identify the particular external application as the email application. The machine learning model may further determine to generate a function call in order to perform the user-requested task (e.g., drafting and sending of the email to Anya). Based on the identified external application and the determination, the machine learning model may generate a function call that includes a function for preparing and sending an email, or at least a function for accessing the external application (e.g., "send_email(to: recipient, body: string)") and a generated argument for the variables or placeholders within the function (e.g., "recipient": "Anya" and "string": "Coffee next Friday?"). The machine learning model may then send the generated function call to the external application (e.g., to the email application) to execute the function with its argument by calling an external API with the generated function call and arguments. In response to the received function call, the external API may provide a response to the function call (e.g., a confirmation that an email was sent to the specific recipient, the email having a specific text, both of which were indicated in the arguments of the function call). Based on the response provided by the external API, the machine learning model may generate an output (e.g., "An email has been sent to Anya with the following message: 'Coffee next Friday?'"). The output may then be sent to the user or to another processor or system, as the answer to the received input.

In some of the disclosed methods, systems, or apparatuses, the received input may be provided by a user and may include, e.g., a request for information from a database associated with a business of the user (e.g., "Who are my top customers?"). A machine learning model may then process the received input, determine a computational task associated with the input, and convert the input into a structured representation of the computational task. For example, the determined computational task may involve accessing an internal database and querying the internal database for the top customers listed in the database, and the converted structured representation may include a function associated with accessing and querying the database, the function having defined parameters and at least one argument placeholder representing variable data (e.g., the variable data may include the number of top customers, the ranking logic, or another variable value). Based on the structured representation or the determined computational task, the machine learning model may determine that an external application (e.g., the internal database) may be required for performing the user-requested task. In turn, the machine learning model may identify the particular external application as the internal database. In some of the disclosed methods, systems, or apparatuses, the user input may indicate the particular database (or an associated API). The machine learning model may further determine to generate a function call in order to perform the user-requested task (e.g., accessing and querying the internal database). Based on the identified external application and the determination (to generate the function call), as well as any database schema associated with the database and/or specification associated with the database API, the machine learning model may generate a function call that includes a function for querying the database, or at least a function for accessing the database, which complies with the database schema and/or specification (e.g., "get_customers(min_revenue: int-1, created_before: string, limit: int-2") and a generated argument for the variables or placeholders within the function, which also complies with the database schema and/or specification (e.g., "int-1": "100", "string": "2024-01-01", and "int-2": "10"). In some of the disclosed methods or systems, the machine learning model may first generate and execute a function call that requests information about the database schema and/or specification associated with the database API. In this manner, the machine learning model is able to receive information related to the database schema and/or specification (such that, e.g., any further generated function calls may comply with the database scheme and/or specification information). The machine learning model may then send the generated compliant function call to the external application (e.g., to the internal database) to execute the function with its argument by calling the determined or indicated API with the generated function call and arguments. In response to the received function call, the API may provide a response to the function call in code input (e.g., a response in JSON or another programming code format). Based on the response provided by the API, the machine learning model may translate or convert the non-language response into a language output (e.g., from a received code output from the API to "Your top customers are A, B, C, D, and E"). The language output may then be sent to the user or to another processor or system, as the answer to the received input.

In some of the disclosed methods, systems, or apparatuses, the received input may be provided by a user and, e.g., include a request for structured data from text associated with or accessible via a website (e.g., "Create a table listing names and associated birthdays provided in the article located at [link]"). A machine learning model may then process the received input, determine a computational task associated with the input, and convert the input into a structured representation of the computational task. For example, the determined computational task may involve accessing the text of the article via the link, parsing the text to identify names and associated birthdays, and creating a table listing the identified names and associated birthdays. The converted structured representation may include a function associated with accessing and parsing the text, the function having defined parameters without associated arguments. Based on the structured representation or the determined computational task, the machine learning model may determine that an external application (e.g., the website) may be required for performing the user-requested task. In turn, the machine learning model may identify the particular external application as the website, as provided by the user input. The machine learning model may further determine to generate a function call in order to perform the user-requested task (e.g., accessing and parsing the text of the website or article). Based on the identified external application and the determination, the machine learning model may generate a function call which includes a function for parsing the text to extract certain data (e.g., "extract_data (name: string, birthday: string)" or "sql_query(query: string)"). The machine learning model may then send the generated function call to the external application (e.g., to the website) to execute the function by calling the indicated API with the generated function call. In response to the received function call, the API may provide a response to the function call in code input (e.g., a response in JSON or another programming code format). Based on the response provided by the API, the machine learning model may generate an output (e.g., a table with information, generated based on the extracted names and associated birthdays provided in the parsed text). The output may then be sent to the user or to another processor or system, as the answer to the received input.

According to another aspect of the present disclosure, a computer networking apparatus comprising one or more memory devices, one or more network devices, and/or one or more processors connected to the one or more memory devices and the one or more network devices, wherein the one or more processors are configured to perform instructions. The steps embodied in the instructions may include, e.g., the steps of method 300 described herein. As such, the one or more processors may be configured for receiving an input provided by a user, wherein the input includes a request to perform a computational task within a computing environment. The one or more processors may further be configured for employing a machine learning model to process the received input, wherein the machine learning model is trained to convert the input into an output comprising a structured representation of the computational task, wherein the structured representation includes one or more parameters, variables, or operations for executing the computational task. The one or more processors may further be configured for determining, based on the output, and using the machine learning model or an additional machine learning model, to generate a function call to perform the computational task, the function call including a function and at least one argument associated with the function. Further, the one or more processors may be configured for generating, based on the determining, and using the machine learning model or the additional machine learning model, the function call, the function call including at least one of a script, a code, or a data structure for executing the computational task. The one or more processors may also be configured for sending the function call to an external application programming interface (API) to execute the function with the at least one argument. Additionally, the one or more processors may be configured for receiving a response from the external API based on the executed function. Further, the one or more processors may be configured for sending the received response to the machine learning model or an additional machine learning model, wherein the machine learning model or the additional machine learning model generates an output based on the received response. The one or more processors may further be configured for sending the output to the user.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Examples of the disclosed methods, systems, or apparatuses are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create steps for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, the disclosed methods, systems, or apparatuses may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various of the disclosed methods, systems, or apparatuses. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described methods, systems, or apparatuses are not mutually exclusive, and elements, components, materials, or steps described in connection with one example method, system, or apparatus may be combined with, or eliminated from, other disclosed methods, systems, or apparatuses in suitable ways to accomplish desired design objectives.

In the foregoing specification, the disclosed methods, systems, or apparatuses have been described with reference to numerous specific details that can vary from implementation to implementation. Certain adaptations and modifications of the described methods, systems, or apparatuses can be made. Various renditions of the disclosed methods, systems, or apparatuses can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method for generating and executing function calls using a machine learning model, comprising:
   receiving an input, wherein the input comprises a request to perform a computational task within a computing environment;
   employing a machine learning model to process the received input, wherein the machine learning model is trained to:
      identify an external application based on the received input;
      determine, based on the identified external application and by calculating a probability based on a decision boundary and the received input, to generate a function call to perform the computational task, the function call including a function and at least one argument associated with the function; and
      generate, based on the determination, the function and the at least one argument as an output; and
   sending the function and the at least one argument to the user.

2. The method of claim 1, further comprising:
   sending the function call to an external application programming interface (API) to execute the function with the at least one argument;
   receiving a response from the external API based on the executed function; and
   sending the received response to the machine learning model, wherein the machine learning model generates an output based on the received response.

3. The method of claim 2, further comprising sending the output to the user.

4. The method of claim 2, further comprising presenting the received response from the external API to the user via a user interface.

5. The method of claim 1, wherein the user is a computing device.

6. The method of claim 5, wherein the computing device is configured to send a plurality of inputs to the machine learning model based on a single instruction.

7. The method of claim 5, wherein the computing device is configured by receiving instructions including an input field that defines whether the function call must be generated.

8. The method of claim 1, wherein the generated function call is converted into an executable code in a programming language suitable for the computing environment in which the computational task or the function is to be executed.

9. The method of claim 8, wherein the programming language is determined by the machine learning model based on instructions provided by the user.

10. The method of claim 8, wherein the executable code and the programming language are determined by accessing a specification associated with the external API.

11. The method of claim 1, wherein the generated function call further comprises logic for dynamically modifying the computational task based on real-time data or changing conditions.

12. The method of claim 1, wherein the function call further comprises metadata specifying an expected response format or output structure resulting from executing the function populated with the at least one argument.

13. The method of claim 1, further comprising verifying a correctness of the generated function call.

14. The method of claim 13, wherein the machine learning model further provides an output that indicates that the generated and sent function call is incorrect.

15. The method of claim 1, wherein the function call further comprises self-updating information for automatically adapting to changes in data sources, APIs, or dependencies.

16. The method of claim 1, wherein the received input comprises at least two requests to perform different computational tasks or functions.

17. The method of claim 1, wherein the function call includes at least one of a script, a code, or a data structure for executing the computational task.

18. The method of claim 1, wherein the function call further includes error handling information.

19. The method of claim 1, wherein the input includes a template function.

20. The method of claim 1, wherein the input indicates a request for the function call without including a template function.

21. The method of claim 1, wherein the decision boundary is configured for separating a first type of computational task to be performed using the function call from a second type of computational task to be performed without using the function call.

22. The method of claim 1, wherein the decision boundary is one or more of:

a hyperplane;

non-linear; or shiftable to prioritize one class over another class.

23. A system comprising:

at least one memory storing instructions;

at least one processor configured to execute the instructions to perform operations for generating functions in a computing environment, the operations comprising:

receiving an input provided by a user, wherein the input comprises a request to perform a computational task within a computing environment;

employing a machine learning model to process the received input, wherein the machine learning model is trained to:

identify an external application based on the received input;

determine, based on the identified external application and by calculating a probability based on a decision boundary and the received input, to generate a function call, the function call including a function and at least one argument;

access a specification associated with an external API; and generate the function and the at least one argument based on the accessing and based on the input; and sending the function and the at least one argument to the user.

24. A computer networking apparatus comprising:

one or more memory devices;

one or more network devices; and one or more processors connected to the one or more memory devices and the one or more network devices, wherein the one or more processors are configured for:

receiving an input provided by a user, wherein the input comprises a request to perform a computational task within a computing environment;

employing a machine learning model to process the received input, wherein the machine learning model is trained to:

convert the received input into an output that represents the computational task;

identify an external application based on the received input;

determine, based on the identified external application and by calculating a probability based on a decision boundary and the received input, to generate a function call; and generate, based on the output representing the computational task, a function; and sending the function to the user.

\* \* \* \* \*